(12) United States Patent
Kawamura et al.

(10) Patent No.: US 9,671,596 B2
(45) Date of Patent: *Jun. 6, 2017

(54) PLURALITY OF IMAGING OPTICAL SYSTEMS AND IMAGE PICKUP APPARATUS USING THE SAME

(71) Applicant: OLYMPUS CORPORATION, Tokyo (JP)

(72) Inventors: Kazuteru Kawamura, Tokyo (JP); Kazuyuki Iwasa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,390

(22) Filed: Jun. 13, 2016

(65) Prior Publication Data

US 2016/0291298 A1 Oct. 6, 2016

Related U.S. Application Data

(63) Continuation of application No. PCT/JP2015/059060, filed on Mar. 25, 2015.

(30) Foreign Application Priority Data

Jan. 14, 2015 (JP) ................................ 2015-005145

(51) Int. Cl.
G02B 13/00 (2006.01)
G03B 13/32 (2006.01)
(Continued)

(52) U.S. Cl.
CPC .............. *G02B 15/08* (2013.01); *G02B 9/14* (2013.01); *G02B 13/00* (2013.01); *G03B 3/02* (2013.01);
(Continued)

(58) Field of Classification Search
None
See application file for complete search history.

(56) References Cited

U.S. PATENT DOCUMENTS 5,388,006 A 2/1995 Koelsch
7,453,647 B2 11/2008 Take et al.
(Continued)

FOREIGN PATENT DOCUMENTS

JP Hei 05-066346 A 3/1993
JP Hei 07-199067 A 8/1995
(Continued)

OTHER PUBLICATIONS

International Search Report dated Jun. 9, 2015, issued in International Application No. PCT/JP2015/059060.

*Primary Examiner* — W B Perkey
(74) *Attorney, Agent, or Firm* — Andrews Kurth Kenyon LLP

(57) ABSTRACT

A plurality of imaging optical systems includes at least two imaging optical systems, and each imaging optical system includes an identical diaphragm member. Each imaging optical system includes in order from an object side, a front lens unit having a positive refractive power, a focusing lens unit having a negative refractive power, and a rear lens unit having a positive refractive power. The diaphragm member is disposed near the focusing lens unit. At the time of focusing, only the focusing lens unit moves on an optical axis. Each imaging optical system satisfies the following conditional expression (1), and the plurality of imaging optical systems satisfies the following conditional expressions (2) and (3).

$0.5 < f_{ff}/f_{fb} < 1.9$ (1)

$1 \le AP\Phi_{max}/AP\Phi_{min} \le 1.15$ (2)

$1.02 < f_{foLA}/f_{foSM} < 2.50$ (3)

34 Claims, 12 Drawing Sheets

(51) Int. Cl.
    *G02B 9/14*       (2006.01)
    *G02B 15/08*     (2006.01)
    *G03B 7/20*       (2006.01)
    *G03B 3/02*       (2006.01)
    *G02B 9/28*       (2006.01)

(52) U.S. Cl.
    CPC ............... *G03B 7/20* (2013.01); *G03B 13/32* (2013.01); *G02B 9/28* (2013.01)

(56) References Cited

U.S. PATENT DOCUMENTS

| | | | |
|---|---|---|---|
| 8,355,205 B2 | 1/2013 | Yasui | |
| 8,654,456 B2 | 2/2014 | Eguchi | |
| 2006/0066958 A1* | 3/2006 | Take | G02B 15/177 359/692 |
| 2016/0209630 A1* | 7/2016 | Kawamura | H04N 5/2254 |
| 2016/0223798 A1* | 8/2016 | Kawamura | G02B 15/04 |
| 2016/0266370 A1* | 9/2016 | Uchida | G02B 13/22 |

FOREIGN PATENT DOCUMENTS

| | | |
|---|---|---|
| JP | 2006-126806 A | 5/2006 |
| JP | 2010-191211 A | 9/2010 |
| JP | 2011-002555 A | 1/2011 |
| JP | 2012-002999 A | 1/2012 |
| JP | 2012-042791 A | 3/2012 |

\* cited by examiner

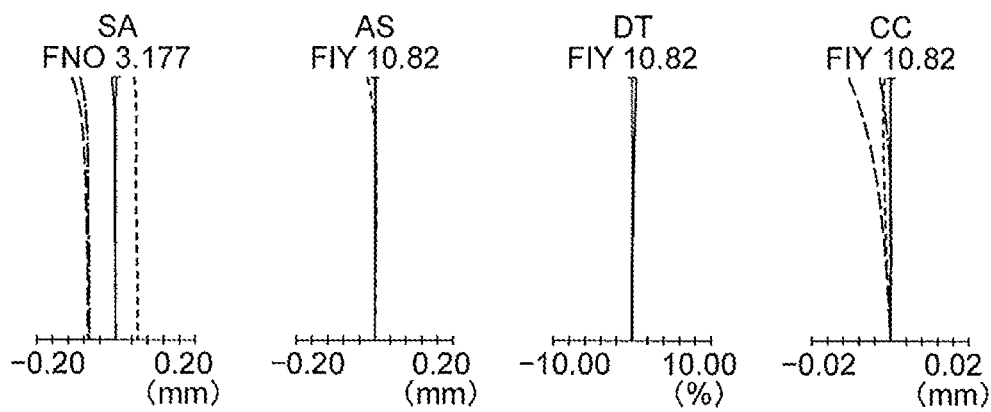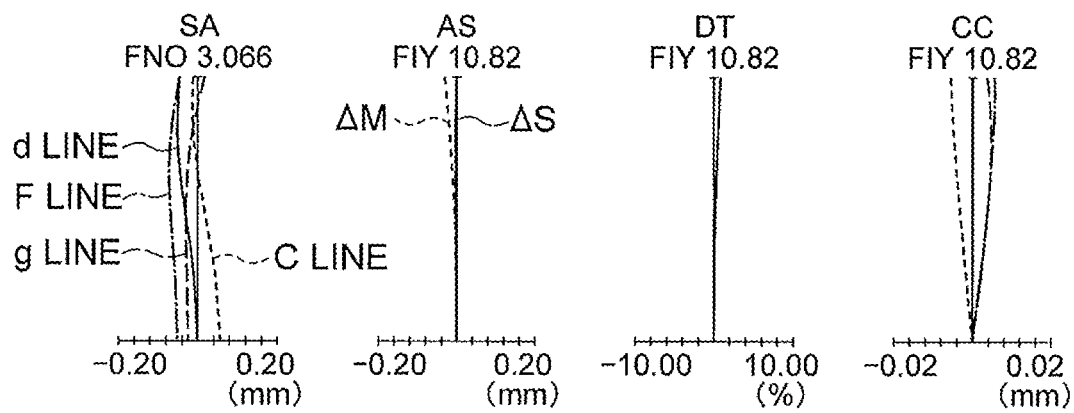

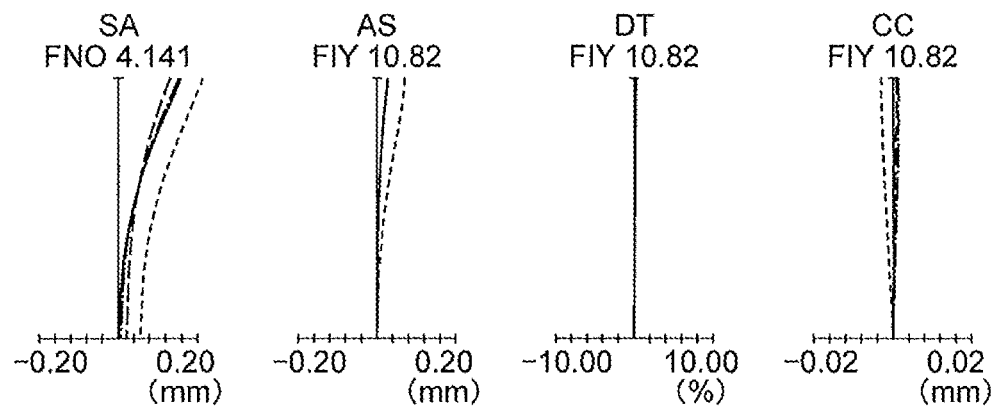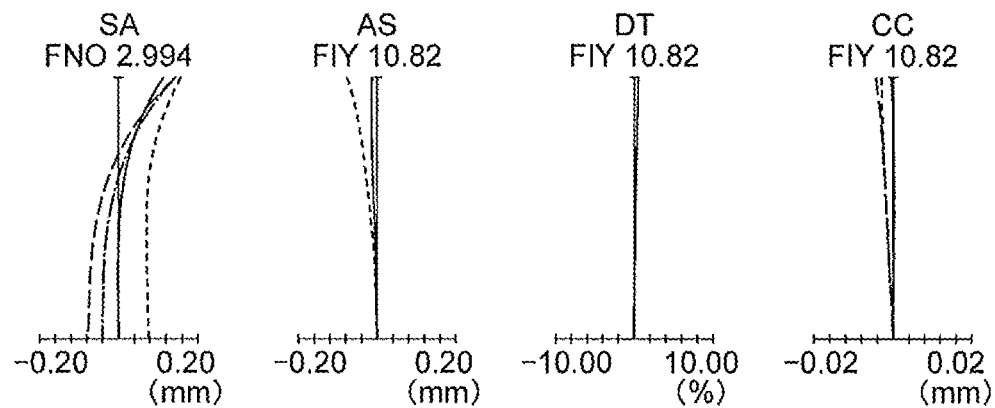

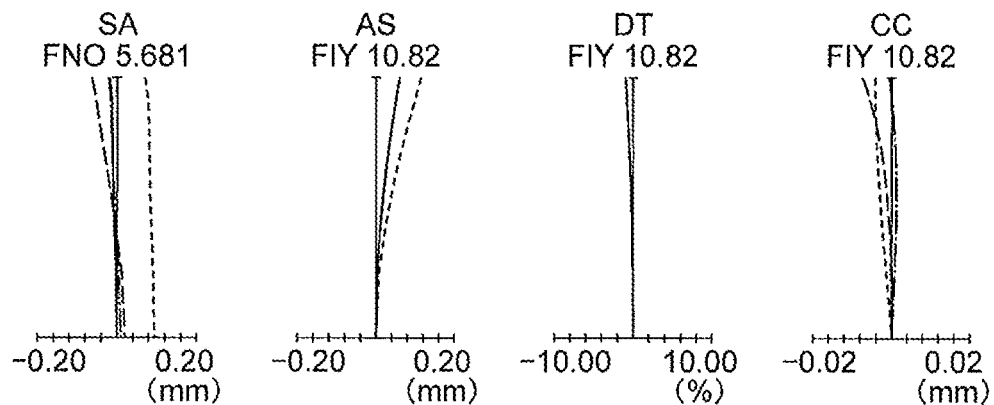
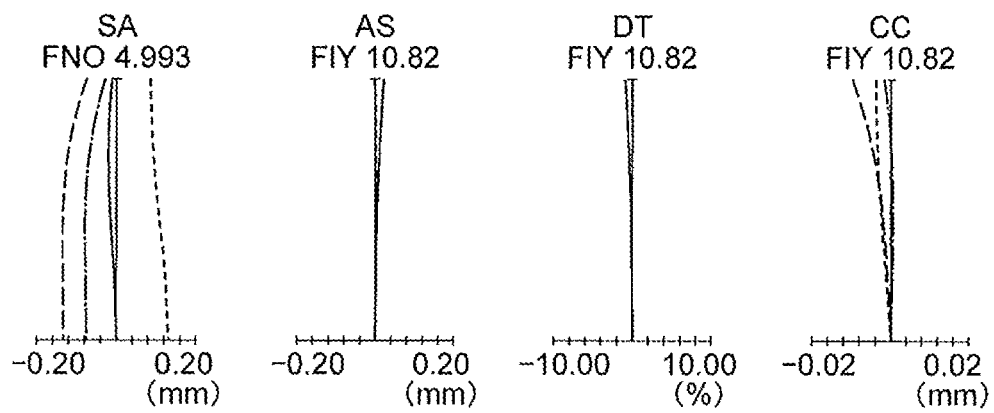

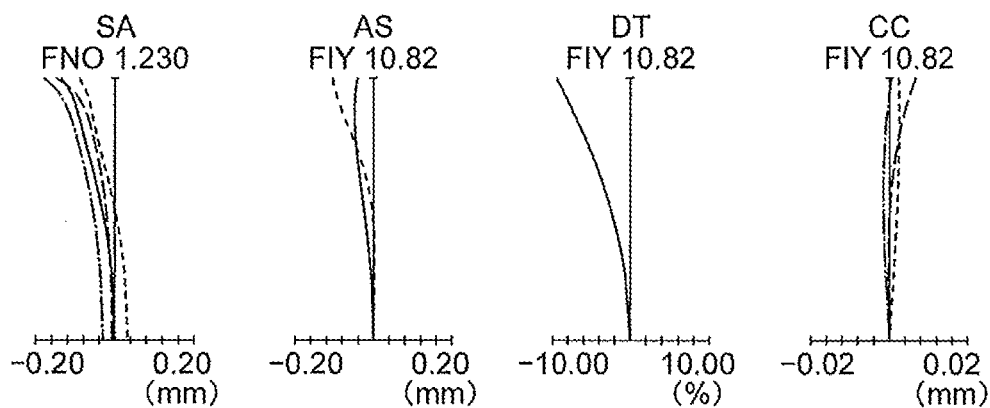
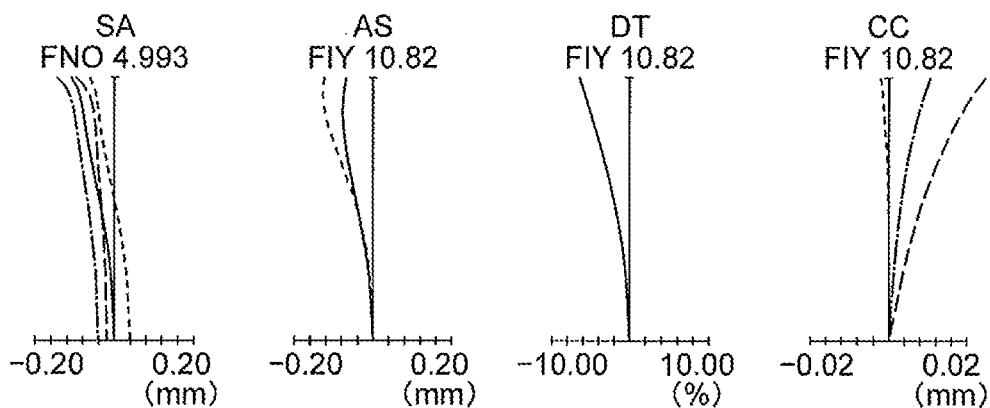

PLURALITY OF IMAGING OPTICAL SYSTEMS AND IMAGE PICKUP APPARATUS USING THE SAME

CROSS-REFERENCE TO RELATED APPLICATION

The present application is a continuation application of PCT/JP2015/059060 filed on Mar. 25, 2015 which is based upon and claims the benefit of priority from Japanese Patent Application No. 2015-005145 filed on Jan. 14, 2015; the entire contents of which are incorporated herein by reference.

BACKGROUND OF THE INVENTION

Field of the Invention

The present invention relates to a plurality of imaging optical systems, and in particular, to a plurality of imaging optical systems in which, a unit which drives a diaphragm member and a focusing lens unit is let to be common in the plurality of imaging optical systems. Moreover, the present invention relates to an image pickup apparatus that includes the plurality of imaging optical systems.

Description of the Related Art

In recent years, imaging optical systems of various specifications have been developed. Particularly, in an interchangeable lens camera, the imaging optical system can be changed in accordance with a scene. Therefore, a user is capable of capturing various scenes. An increase in options of the imaging optical system can be said to be a favorable situation for the user.

On the other hand, with an increase in types of the imaging optical systems, the number of components in the imaging optical system has also increased. Therefore, a period of time and a cost necessary for the development of the imaging optical system, and moreover, the number of manufacturing lines and a production equipment cost have also increased. In such manner, the increase in the types of the imaging optical systems has led to an increase in a burden on a manufacturer.

To solve such problems, a technology of using optical systems in common has been invented. A technology in which, commonality of components in imaging optical systems having different specifications is contemplated, has been proposed in Japanese Patent Application Laid-open Publication Nos. Hei 7-199067, 2010-191211, and 2006-126806.

SUMMARY OF THE INVENTION

A plurality of imaging optical systems according to an aspect of the present invention comprises, at least two imaging optical systems having different focal lengths, wherein each imaging optical system in the plurality of imaging optical systems comprises an identical diaphragm member, and each imaging optical system comprises in order from an object side, a front lens unit having a positive refractive power,
a focusing lens unit having a negative refractive power, and
a rear lens unit having a positive refractive power, and
at the time of focusing, only the focusing lens unit moves on an optical axis, and each imaging optical system satisfies the following conditional expression (1), and the plurality of imaging optical systems satisfies the following conditional expressions (2) and (3):

$$0.5 < f_{ff}/f_{fb} < 1.9 \quad (1)$$

$$1 \le AP\Phi_{max}/AP\Phi_{min} \le 1.15 \quad (2)$$

$$1.02 < f_{foLA}/f_{foSM} < 2.50 \quad (3)$$

where, $f_{ff}$ denotes a focal length of the front lens unit in each imaging optical system, $f_{fb}$ denotes a focal length of the rear lens unit in each imaging optical system, $AP\Phi_{max}$ denotes a maximum diameter from among diameters of aperture stops in the plurality of imaging optical systems, $AP\Phi_{min}$ denotes a minimum diameter from among diameters of aperture stops in the plurality of imaging optical systems, $f_{foLA}$ denotes a maximum focal length from among focal lengths of the focusing lens units in the plurality of imaging optical systems, and $f_{foSM}$ denotes a minimum focal length from among focal lengths of the focusing lens units in the plurality of imaging optical systems, and here, the maximum focal length and the minimum focal length are to be obtained by comparing absolute values of the focal lengths.

Moreover, a plurality of imaging optical systems according to another aspect of the present invention comprises, at least two imaging optical systems having different focal lengths, wherein each imaging optical system in the plurality of imaging optical systems comprises an identical focusing unit, and each imaging optical system comprises in order from an object side, a front lens unit having a positive refractive power, and
a focusing lens unit having a negative refractive power, and each imaging optical system includes a diaphragm member, and the diaphragm member is disposed near the focusing lens unit, and at the time of focusing, only the focusing lens unit moves on an optical axis, and the plurality of imaging optical systems satisfies the following conditional expressions (3) and (4).

$$1.02 < f_{foLA}/f_{foSM} < 2.50 \quad (3)$$

$$1 \le K_{max}/K_{min} \le 1.65 \quad (4)$$

where, $f_{foLA}$ denotes a maximum focal length from among focal lengths of the focusing lens units in the plurality of imaging optical systems, and $f_{foSM}$ denotes a minimum focal length from among focal lengths of the focusing lens units in the plurality of imaging optical systems, and here, the maximum focal length and the minimum focal length are to be obtained by comparing absolute values of the focal lengths, $K_{max}$ denotes a maximum ratio from among ratios expressed by K, $K_{min}$ denotes a minimum ratio from among ratios expressed by K, here, K (unit mm) is expressed by $K=fb_{LD}/MG_{fo}$,
where,
$fb_{LD}$ is expressed by $fb_{LD}=f^2/2000$ mm,
where,
f denotes a focal length of an overall system of each imaging optical system at the time of infinite object point focusing, and
$MG_{fo}$ denotes a focusing sensitivity of each imaging optical system, where,
the focusing sensitivity is an amount of movement of an image plane with respect to a unit amount of movement of the focusing lens unit at the time of infinite object point focusing.

Moreover, an image pickup apparatus according to the present invention comprises,
an imaging optical system, and
an image pickup element which has an image pickup surface, and which converts an image formed on the image pickup element by the imaging optical system, to an electric signal, wherein
the imaging optical system is one of the plurality of imaging optical systems described above.

BRIEF DESCRIPTION OF THE DRAWINGS

FIG. 2A, FIG. 2B, FIG. 2C, FIG. 2D, FIG. 2E, FIG. 2F, FIG. 2G, and FIG. 2H are aberration diagrams according to the example A at the time of focusing to an infinite object point and at the time of focusing to a close object point;

FIG. 4A, FIG. 4B, FIG. 4C, FIG. 4D, FIG. 4E, FIG. 4F, FIG. 4G, and FIG. 4H are aberration diagrams according to the example B at the time of focusing to an infinite object point and at the time of focusing to a close object point;

FIG. 6A, FIG. 6B, FIG. 6C, FIG. 6D, FIG. 6E, FIG. 6F, FIG. 6G, and FIG. 6H are aberration diagrams according to the example C at the time of focusing to an infinite object point and at the time of focusing to a close object point;

FIG. 8A, FIG. 8B, FIG. 8C, FIG. 8D, FIG. 8E, FIG. 8F, FIG. 8G, and FIG. 8H are aberration diagrams according to the example D at the time of focusing to an infinite object point and at the time of focusing to a close object point;

DETAILED DESCRIPTION OF THE INVENTION

Figure 1:
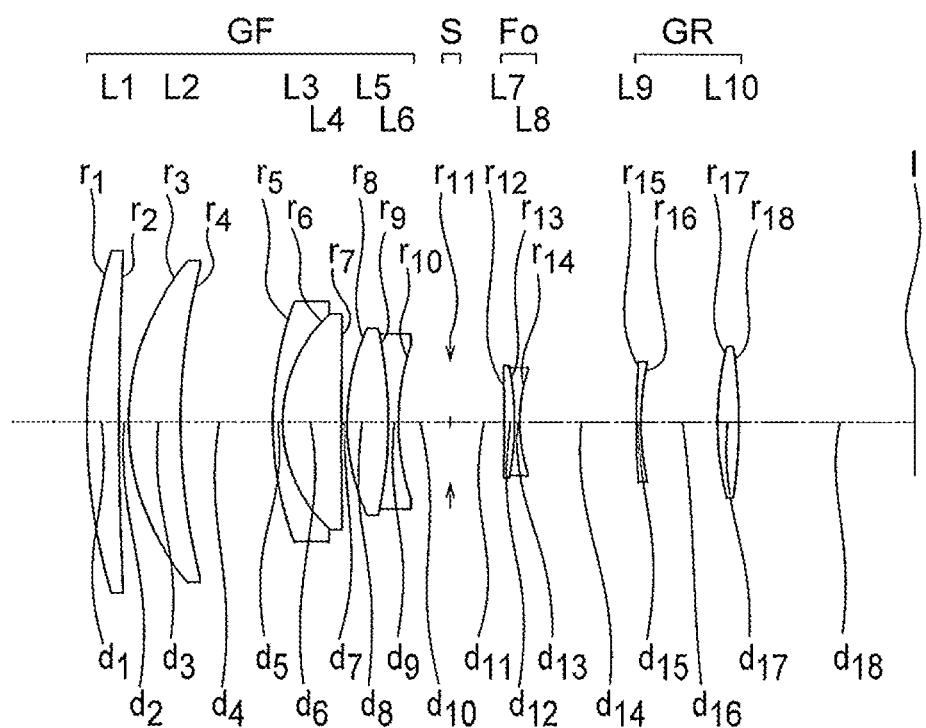
FIG. 1 is a cross-sectional view along an optical axis showing an optical arrangement of an imaging optical system according to an example A at the time of infinite object point focusing.

Examples of plurality of imaging optical systems will be described below in detail by referring to the accompanying diagrams. However, the present invention is not restricted to the examples described below. Moreover, in the plurality of imaging optical systems according to the embodiments, use in common of main components in the imaging optical systems is facilitated. Examples of main components are a diaphragm member and a focusing unit.

A plurality of imaging optical systems according to a first embodiment includes at least two imaging optical systems having different focal lengths, and each imaging optical system in the plurality of imaging optical systems includes an identical diaphragm member, and each imaging optical system includes in order from an object side, a front lens unit having a positive refractive power, a focusing lens unit having a negative refractive power, and a rear lens unit having a positive refractive power, and at the time of focusing, only the focusing lens unit moves on an optical axis, and each imaging optical system satisfies the following conditional expression (1), and the plurality of imaging optical systems satisfies the following conditional expressions (2) and (3):

$$0.5 < f_{ff}/f_{fb} < 1.9 \quad (1)$$

$$1 \leq AP\Phi_{max}/AP\Phi_{min} \leq 1.15 \quad (2)$$

$$1.02 < f_{foLA}/f_{foSM} < 2.50 \quad (3)$$

where,
$f_{ff}$ denotes a focal length of the front lens unit in each imaging optical system,
$f_{fb}$ denotes a focal length of the rear lens unit in each imaging optical system,
$AP\Phi_{max}$ denotes a maximum diameter from among diameters of aperture stops in the plurality of imaging optical systems,
$AP\Phi_{min}$ denotes a minimum diameter from among diameters of aperture stops in the plurality of imaging optical systems,
$f_{foLA}$ denotes a maximum focal length from among focal lengths of the focusing lens units in the plurality of imaging optical systems, and
$f_{foSM}$ denotes a minimum focal length from among focal lengths of the focusing lens units in the plurality of imaging optical systems, and here,
the maximum focal length and the minimum focal length are to be obtained by comparing absolute values of the focal lengths.

The plurality of imaging optical systems according to the first embodiment includes at least two imaging optical systems having different focal lengths, and each imaging optical system in the plurality of imaging optical systems includes an identical diaphragm member. Moreover, each imaging optical system includes in order from the object side, the front lens unit having a positive refractive power, the focusing lens unit having a negative refractive power, and the rear lens unit having a positive refractive power. The diaphragm member is disposed near the focusing lens unit, and at the time of focusing, only the focusing lens unit moves on the optical axis.

The plurality of imaging optical systems according to the first embodiment includes at least two imaging optical systems having different focal lengths. In each imaging optical system of the plurality of imaging optical systems, the diaphragm member is used in common.

The diaphragm member includes at least three components. The three components are, a member determining a diaphragm diameter, a diaphragm blade member, and a first drive actuator. The first drive actuator is used for drive of a diaphragm. Moreover, an aperture stop is either the member determining the diaphragm diameter or the diaphragm blade member.

The plurality of imaging optical systems according to the first embodiment includes in order from the object side, the front lens unit having a positive refractive power, the focusing lens unit having a negative refractive power, and the rear lens unit having a positive refractive power. In such arrangement of lens units (hereinafter, referred to as 'first arrangement'), in the imaging optical systems in which, the diaphragm member is used in common, the refractive power of an optical system on the object side of the focusing lens unit having a negative refractive power becomes a positive refractive power. Accordingly, since the focusing lens unit is to be disposed at a position where a light beam is converged, it is possible to improve an imaging magnification of the focusing lens unit. Moreover, since a focusing sensitivity is improved by the imaging magnification of the focusing lens unit being improved, it is possible to reduce a moving distance of the focusing lens unit. A second drive actuator is to be used for moving the focusing lens unit.

Furthermore, since the focusing lens unit is disposed at the position where the light beam is converged, it is possible to make the focusing lens unit small-sized and light-weight. Moreover, the diaphragm member can be disposed near the focusing lens unit. Concretely, the diaphragm member can be disposed on the object side of the focusing lens unit. By disposing the diaphragm member near the focusing lens unit, it is possible to make the diaphragm member small-sized.

In such manner, in the plurality of imaging optical systems according to the first embodiment, it is possible to reduce the moving distance of the focusing lens unit as well as to make the diaphragm member small-sized. As a result, it is possible to narrow both, a space necessary for the movement of the focusing lens unit and a space for disposing a drive unit. The drive unit is at least one of a first drive actuator and the second drive actuator.

Moreover, the refractive power of an optical system on the image side of the focusing lens unit having a negative refractive power becomes the positive refractive power. By doing so, in each imaging optical system, an order of arrangement of refractive power assumed becomes a positive refractive power, a negative refractive power, and a positive refractive power. Therefore, in each imaging optical system, it is possible correct mainly a spherical aberration and a curvature of field favorably. As a result, in each imaging optical system, it is possible to achieve an arrangement in which, a fluctuation in aberration at the time of focusing is less, and shortening an overall length of the optical system is easy.

In such manner, in the first arrangement, it is possible to realize in each imaging optical system, an arrangement which enables to achieve a favorable imaging performance while making the space for the drive unit small, and shortening the overall length of the optical system. In the plurality of imaging optical systems, it is possible to realize easily an arrangement which enables a use in common of the diaphragm member.

Moreover, in each imaging optical system, it is preferable to arrange the focusing lens unit such that, the refractive power of the focusing lens unit differs in each imaging optical system. By doing so, in each imaging optical system, it is possible correct mainly the spherical aberration and the curvature of field favorably. As a result, it is possible to reduce a fluctuation in these aberrations at the time of focusing.

Moreover, each imaging optical system satisfies the following conditional expression (1):

$$0.5 < f_{ff}/f_{fb} < 1.9 \quad (1)$$

where, $f_{ff}$ denotes a focal length of the front lens unit in each imaging optical system, and $f_{fb}$ denotes a focal length of the rear lens unit in each imaging optical system.

Conditional expression (1) is a conditional expression regarding a balance of the refractive power of the front lens unit and the refractive power of the rear lens unit in each imaging optical system.

When exceeding an upper limit value of conditional expression (1), since the refractive power of the front lens unit becomes small, shortening the overall length of the optical system becomes difficult, and the focusing sensitivity is degraded. By the focusing sensitivity being degraded, since the amount of movement of the focusing lens unit increases, it becomes difficult to secure sufficiently the space for the focusing lens unit. Moreover, the spherical aberration and the curvature of field cannot be corrected favorably.

When falling below a lower limit value of conditional expression (1), since the refractive power of the front lens unit becomes large, the spherical aberration and the curvature of field cannot be corrected favorably.

Furthermore, the plurality of imaging optical systems satisfies the following conditional expressions (2) and (3).

$$1 \leq AP\Phi_{max}/AP\Phi_{min} \leq 1.15 \quad (2)$$

$$1.02 < f_{foLA}/f_{foSM} < 2.50 \quad (3)$$

where, $AP\Phi_{max}$ denotes a maximum diameter from among diameters of aperture stops in the plurality of imaging optical systems, $AP\Phi_{min}$ denotes a minimum diameter from among diameters of aperture stops in the plurality of imaging optical systems, $f_{foLA}$ denotes a maximum focal length from among focal lengths of the focusing lens units in the plurality of imaging optical systems, and $f_{foSM}$ denotes a minimum focal length from among focal lengths of the focusing lens units in the plurality of imaging optical systems, and here, the maximum focal length and the minimum focal length are to be obtained by comparing absolute values of the focal lengths.

Conditional expression (2) is a conditional expression in which, a proportion of the maximum value of a diameter of an aperture stop in the plurality of imaging optical systems and the minimum value of the diameter of the aperture stop in the plurality of imaging optical systems is regulated. In a state of conditional expression (2) not satisfied, when a member determining a diaphragm diameter or a diaphragm blade member is let to be in common, a shape of an opening in a state of maximum aperture becomes a polygonal shape in at least one imaging optical system. When the shape of the opening is a polygonal shape, effect of blur of background is deteriorated. Therefore, falling below the lower limit value of conditional expression (8), or exceeding the upper limit value of conditional expression (8) is not preferable.

Conditional expression (3) is a conditional expression in which, a proportion of the maximum value of the focal length of the focusing lens unit in the plurality of imaging optical systems and the minimum value of the focal length of the focusing lens unit in the plurality of imaging optical systems is regulated.

When falling below a lower limit value of conditional expression (3), a difference in focal lengths of overall systems of an imaging optical system with the longest focal length of the focusing lens unit and an imaging optical system having the minimum value with the shortest focal length of the focusing lens unit cannot be increased. Therefore, an effective difference in specifications as an imaging optical system is not achieved. Particularly, it becomes difficult to make an optical system small-sized upon reducing an aberration fluctuation at the time of focusing, with the spherical aberration and a curvature of field maintained favorably in each imaging optical system, while letting to have an effective difference in specifications as an imaging optical system.

Moreover, when exceeding an upper limit value of conditional expression (3), a diameter of the focusing lens unit differs substantially in each imaging optical system. In other words, a difference in a diameter of the focusing lens unit for an imaging optical system with the largest diameter of the focusing lens unit and a diameter of the focusing lens unit for an imaging optical system with the smallest diameter of the focusing lens unit becomes excessively large. In this case, since a location for disposing a drive unit, and a space for disposing the drive unit vary for each imaging optical system, it becomes difficult to make the diaphragm member in common.

By the difference in the diameters of the focusing lens units becoming large, there arises a need to shift the diaphragm member in an optical axial direction, to set an F-number of the imaging optical system to a desired value. As aforementioned, the diaphragm member has been disposed near the focusing lens unit. Moreover, other lens or a frame member of a lens is anterior and posterior to the diaphragm member. In a case in which, a sufficient space has been secured anterior and posterior to the diaphragm member, no problem arises for the movement of the diaphragm member. However, in an optical system intended to be small-sized, a space that can be secured anterior and posterior to the diaphragm member is limited. For this reason, to avoid an interference with a lens or a frame member, there is a need to modify the diaphragm member.

Particularly, in a drive of the diaphragm member by the first drive actuator, a space in the optical axial direction is used widely. When the space in the optical axial direction is widened, a lens or a frame member becomes susceptible to interfere with the diaphragm member, in the optical axial direction. Therefore, a modification of the actuator itself, or a modification of an actuator position in the diaphragm member becomes necessary. Therefore, it becomes difficult to make the diaphragm member in common. For such reason, it is preferable that conditional expression (3) is satisfied.

It is preferable that the following conditional expression (1)" is satisfied instead of conditional expression (1).

$$0.60 < f_{ff}/f_{fb} < 1.75 \qquad (1)''$$

Moreover, it is more preferable that the following conditional expression (1)''' is satisfied instead of conditional expression (1).

$$0.65 < f_{ff}/f_{fb} < 1.65 \qquad (1)'''$$

It is preferable that the following conditional expression (3)' is satisfied instead of conditional expression (3).

$$1.03 < f_{foLA}/f_{foSM} < 2.00 \qquad (3)'$$

Moreover, it is more preferable that the following conditional expression (3)" is satisfied instead of conditional expression (3).

$$1.04 < f_{foLA}/f_{foSM} < 1.50 \qquad (3)''$$

A plurality of imaging optical systems according to a second embodiment includes at least two imaging optical systems having different focal lengths, and each imaging optical system in the plurality of imaging optical systems includes an identical focusing unit, and each imaging optical system includes in order from an object side, a front lens unit having a positive refractive power, and a focusing lens unit having a negative refractive power, and each imaging optical system includes a diaphragm member, and the diaphragm member is disposed near the focusing lens unit, and at the time of focusing, only the focusing lens unit moves on the optical axis, and the plurality of imaging optical systems satisfies the following conditional expressions (3) and (4):

$$1.02 < f_{foLA}/f_{foSM} < 2.50 \qquad (3)$$

$$1 \leq K_{max}/K_{min} \leq 1.65 \qquad (4)$$

where, $f_{foLA}$ denotes a maximum focal length from among focal lengths of the focusing lens units in the plurality of imaging optical systems, and $f_{foSM}$ denotes a minimum focal length from among focal lengths of the focusing lens units in the plurality of imaging optical systems, and here, the maximum focal length and the minimum focal length are to be obtained by comparing absolute values of the focal lengths, $K_{max}$ denotes a maximum ratio from among ratios expressed by K, $K_{min}$ denotes a minimum ratio from among ratios expressed by K, here, K (unit mm) is expressed by $K = fb_{LD}/MG_{fo}$, where, $fb_{LD}$ is expressed by $fb_{LD} = f^2/2000$ mm, where, f denotes a focal length of an overall system of each imaging optical system at the time of infinite object point focusing, and $MG_{fo}$ denotes a focusing sensitivity of each imaging optical system, where, the focusing sensitivity is an amount of movement of an image plane with respect to a unit amount of movement of the focusing lens unit at the time of infinite object point focusing.

The plurality of imaging optical systems according to the second embodiment includes at least two imaging optical systems having different focal lengths, and each imaging optical system in the plurality of imaging optical systems includes an identical focusing unit. Moreover, each imaging optical system includes in order from the object side, the front lens unit having a positive refractive power and the focusing lens unit having a negative refractive power. Each imaging optical system includes the diaphragm member, and the diaphragm member is disposed near the focusing lens unit. At the time of focusing, only the focusing lens unit moves on the optical axis.

The plurality of imaging optical systems according to the second embodiment includes at least two imaging optical systems having different focal lengths. In each imaging optical system of the plurality of imaging optical systems, the focusing lens unit is used in common.

The focusing unit includes at least the second drive actuator. The second drive actuator is used for moving the focusing lens unit.

The plurality of imaging optical systems according to the second embodiment includes in order from the object side, the front lens unit having a positive refractive power and the focusing lens unit having a negative refractive power. In such arrangement of lens units (hereinafter, referred to as 'second arrangement'), in the imaging optical systems that use the focusing lens unit in common, an optical system on the object side of the focusing lens unit having a negative refractive power, assumes a positive refractive power. Accordingly, since the focusing lens unit is to be disposed at a position where a light beam is converged, it is possible to improve the imaging magnification of the focusing lens unit. Moreover, since the focusing sensitivity is improved by the imaging magnification of the focusing lens unit being improved, it is possible to reduce the moving distance of the focusing lens unit.

Furthermore, since the focusing lens unit is disposed at the position where the light beam is converged, it is possible to make the focusing lens unit small-sized and light-weight. Moreover, by disposing the diaphragm member near the focusing lens unit, it is possible to make the diaphragm member small-sized.

In such manner, in the plurality of imaging optical systems according to the second embodiment, it is possible to reduce the moving distance of the focusing lens unit as well as to make the diaphragm member small-sized. As a result, it is possible to narrow both, a space necessary for the movement of the focusing lens unit and a space for disposing a drive unit.

In such manner, in the second arrangement, it is possible to realize in each imaging optical system, an arrangement which enables to achieve a favorable imaging performance while making the space for the drive unit small, and shortening the overall length of the optical system. In the plurality of imaging optical systems, it is possible to realize easily an arrangement which enables a use in common of the diaphragm member.

Moreover, the plurality of imaging optical systems satisfies the following conditional expressions (3) and (4):

$$1.02 < f_{foLA}/f_{foSM} < 2.50 \quad (3)$$

$$1 \le K_{max}/K_{min} \le 1.65 \quad (4)$$

where, $f_{foLA}$ denotes a maximum focal length from among focal lengths of the focusing lens units in the plurality of imaging optical systems, and $f_{foSM}$ denotes a minimum focal length from among focal lengths of the focusing lens units in the plurality of imaging optical systems, and here, the maximum focal length and the minimum focal length are to be obtained by comparing absolute values of the focal lengths, $K_{max}$ denotes a maximum ratio from among ratios expressed by K, $K_{min}$ denotes a minimum ratio from among ratios expressed by K, here, K (unit mm) is expressed by $K = fb_{LD}/MG_{fo}$, where, $fb_{LD}$ is expressed by $fb_{LD} = f^2/2000$ mm, where, f denotes a focal length of an overall system of each imaging optical system at the time of infinite object point focusing, and $MG_{fo}$ denotes a focusing sensitivity of each imaging optical system, where, the focusing sensitivity is an amount of movement of an image plane with respect to a unit amount of movement of the focusing lens unit at the time of infinite object point focusing.

Since the technical significance of conditional expression (3) has already been explained, the description thereof is omitted here.

Conditional expression (4) is a conditional expression in which, a proportion of the maximum value of drive amount in the focusing lens unit and the minimum value of the drive amount in the focusing lens unit is regulated. It is possible to calculate the drive amount from an amount of movement of the focusing lens unit.

At the time of focusing, the focusing lens unit and the image plane move same direction. Therefore, numerical value of the focusing sensitivity becomes positive value.

When the focusing lens unit is used in common in a state of exceeding an upper limit value of conditional expression (4), the drive amount in the focusing lens unit differs substantially in each imaging optical system. In other words, a difference in the drive amount for the imaging optical system with the largest drive amount and the drive amount for the imaging optical system with the smallest drive amount becomes excessively large. In this case, even in the imaging optical system with the small drive amount, since it is necessary to secure a same space as in the imaging optical system with the largest drive amount, small-sizing of the imaging optical system becomes difficult.

It is preferable that the following conditional expression (4)″ is satisfied instead of conditional expression (4).

$$1 \le K_{max}/K_{min} \le 1.50 \quad (4)''$$

Moreover, it is more preferable that the following conditional expression (4)‴ is satisfied instead of conditional expression (4).

$$1 \le K_{max}/K_{min} \le 1.30 \quad (4)'''$$

Moreover, in the plurality of imaging optical systems according to the first embodiment and the plurality of imaging optical systems according to the second embodiment (hereinafter, referred to as 'plurality of imaging optical systems according to the embodiment'), it is preferable that in each imaging optical system, the diaphragm member is disposed between the front lens unit and the focusing lens unit.

Between the front lens unit and the focusing lens unit, a diameter of a center beam varies substantially comparatively, according to a position on the optical axis. Therefore, by disposing the diaphragm member between the front lens unit and the focusing lens unit, control of a diameter of an aperture stop becomes easy. Accordingly, it becomes easier to use the diaphragm member in common.

Moreover, in the plurality of imaging optical systems according to the present embodiment, it is preferable that each imaging optical system satisfies the following conditional expression (5):

$$1.0 < \Phi_{LD}/\Phi_c < 1.25 \quad (5)$$

where, $\Phi_{LD}$ denotes a maximum effective aperture in the focusing lens unit in each imaging optical system, and $\Phi_c$ denotes a maximum diameter of an axial image forming light beam in the focusing lens unit in each imaging optical system.

Conditional expression (5) is a conditional expression in which, a proportion of the effective aperture of the focusing lens unit in each imaging optical system and the diameter of the image forming light beam on the optical axis is regulated.

When falling below a lower limit value of conditional expression (5), the F-number is determined by the focusing lens unit. In this case, the F-number changes with the movement of the focusing lens, and an amount of change in the F-number becomes large. When exceeding an upper limit value of conditional expression (5), since the effective aperture of the focusing lens unit becomes excessively large, making the diameter of the optical system small becomes difficult.

It is more preferable that the following conditional expression (5)' is satisfied instead of conditional expression (5).

$$1.03 < \Phi_{LD}/\Phi_c < 1.20 \quad (5)'$$

Moreover, it is even more preferable that the following conditional expression (5)" is satisfied instead of conditional expression (5).

$$1.04 < \Phi_{LD}/\Phi_c < 1.15 \quad (5)''$$

Moreover, in the plurality of imaging optical systems according to the second embodiment, it is preferable that in each imaging optical system, a rear lens unit having a positive refractive power is disposed on an image side of the focusing lens unit.

By adopting such arrangement, the refractive power of an optical system on the image side of the focusing lens unit having a negative refractive power becomes a positive refractive power. In this case, in each imaging optical system, an arrangement of refractive power becomes a positive refractive power, a negative refractive power, and a positive refractive power. Therefore, in each imaging optical system, it is possible to correct mainly the spherical aberration and the curvature of field favorably. As a result, in each imaging optical system, it is possible to realize an arrangement in which, a fluctuation in aberration at the time of focusing is less, and shortening the overall length of the optical system is easy.

Moreover, in the plurality of imaging optical systems according to the first embodiment, it is preferable that the plurality of imaging optical systems satisfies the following conditional expression (4)':

$$1 \leq K_{max}/K_{min} \leq 1.60 \quad (4)'$$

where, $K_{max}$ denotes a maximum ratio from among ratios expressed by K, $K_{min}$ denotes a minimum ratio from among ratios expressed by K, here, K (unit mm) is expressed by $K = fb_{LD}/MG_{fo}$, where, $fb_{LD}$ is expressed by $fb_{LD} = f^2/2000$ mm, where, f denotes the focal length of an overall system of each imaging optical system at the time of infinite object point focusing, and $MG_{fo}$ denotes a focusing sensitivity of each imaging optical system, where, the focusing sensitivity is an amount of movement of an image plane with respect to a unit amount of movement of the focusing lens unit at the time of infinite object point focusing.

Conditional expression (4)' is a conditional expression in which, a proportion of the maximum value of a drive amount in the focusing lens unit and the minimum value of the drive amount in the focusing lens unit is regulated. The technical significance of conditional expression (4)' is the same as the technical significance of conditional expression (4).

It is preferable that the following conditional expression (4)" is satisfied instead of conditional expression (4)'.

$$1 \leq K_{max}/K_{min} \leq 1.50 \quad (4)''$$

Moreover, it is more preferable that the following conditional expression (4)''' is satisfied instead of conditional expression (4)'.

$$1 \leq K_{max}/K_{min} \leq 1.30 \quad (4)'''$$

Moreover, in the plurality of imaging optical systems according to the second embodiment, it is preferable that each imaging optical system satisfies the following conditional expression (1)':

$$0.5 < f_{ff}/f_{fb} < 1.8 \quad (1)'$$

where, $f_{ff}$ denotes a focal length of the front lens unit in each imaging optical system, and $f_{fb}$ denotes a focal length of the rear lens unit in each imaging optical system.

Conditional expression (1)' is a conditional expression regarding a balance of the refractive power of the front lens unit and the refractive power of the rear lens unit in each imaging optical system. The technical significance of conditional expression (1)' is the same as the technical significance of conditional expression (1).

It is more preferable that the following conditional expression (1)" is satisfied instead of conditional expression (1)'.

$$0.60 < f_{ff}/f_{fb} < 1.75 \quad (1)''$$

Moreover, it is even more preferable that the following conditional expression (1)''' is satisfied instead of conditional expression (1)'.

$$0.65 < f_{ff}/f_{fb} < 1.65 \quad (1)'''$$

Moreover, in the imaging optical system of the present embodiment, it is preferable that each imaging optical system satisfies the following conditional expression (6):

$$0.06 < |f_{fo}/f| < 0.4 \quad (6)$$

where, $f_{fo}$ denotes a focal length of the focusing lens unit in each imaging optical system, and f denotes a focal length of an overall system of each imaging optical system at the time of infinite object point focusing.

Conditional expression (6) is a conditional expression in which, the refractive power of the focusing lens unit in each imaging optical system is regulated. In conditional expression (6), normalization is carried out by the focal length of the overall system in each imaging optical system.

When falling below a lower limit value of conditional expression (6), since the refractive power of the focusing lens unit becomes large, mainly the spherical aberration occurs substantially. Therefore, it becomes difficult to achieve a favorable imaging performance at the time of focusing. Since an improvement in the imaging performance leads to an increase in the number of lenses, making the focusing unit light-weight becomes difficult.

When exceeding an upper limit value of conditional expression (6), an amount of movement of the focusing lens unit at the time of focusing increases. In this case, since a wide space is to be secured for the movement of the focusing lens unit, shortening the overall length of the optical system becomes difficult. For suppressing the amount of movement of the focusing lens unit, it is preferable to improve the focusing sensitivity, and for improving the focusing sensitivity, it is necessary to make the positive refractive power of the front lens unit large. However, when the positive refractive power of the front lens unit is made large, an amount of the spherical aberration, a coma, and an astigmatism, occurring in the front lens unit increases. Therefore, it becomes difficult to achieve a favorable imaging performance throughout the entire focusing range.

It is preferable that the following conditional expression (6)' is satisfied instead of conditional expression (6).

$$0.1<|f_{fc}/f|<0.3 \qquad (6)'$$

Moreover, it is more preferable that the following conditional expression (6)" is satisfied instead of conditional expression (6).

$$0.1<|f_{fc}/f|<0.25 \qquad (6)''$$

Moreover, in the plurality of imaging optical systems according to the present embodiment, it is preferable that the plurality of imaging optical systems includes one of a positive lens and a negative lens as a common lens, and each of at least two imaging optical systems from among the plurality of imaging optical systems includes the common lens in the front lens unit.

In an imaging optical system of a telephoto type, correcting the spherical aberration and a longitudinal chromatic aberration favorably is important for realizing a favorable imaging performance. It is possible to correct the spherical aberration and the longitudinal chromatic favorably by a positive lens and a negative lens. Therefore, the positive lens or the negative lens which has an effect of correcting the spherical aberration and the longitudinal chromatic aberration is let to be the common lens. Moreover, it is preferable to let at least two common lenses to be used in common in the imaging optical system.

By doing so, even when the lens is used in common, at a designing stage of the use in common, it becomes easy to secure an imaging performance in which, balance has been maintained in each imaging optical system. As a result, even in a case in which, an imaging optical system of a telephoto type is included in the plurality of imaging optical systems, it is possible to maintain a favorable imaging performance in each imaging optical system.

Moreover, by using a lens in common, since it is possible to use jigs and tools used for processing a lens in each imaging optical system, making each imaging optical system low-cost is facilitated.

Moreover, in the plurality of imaging optical systems according to the present embodiment, it is preferable that at least in two imaging optical systems from among the plurality of imaging optical systems, the focusing unit includes an identical member, and the following conditional expression (7) is satisfied:

$$1 \leq LDW_{max}/LDW_{min} \leq 1.65 \qquad (7)$$

where, $LDW_{max}$ denotes a maximum lens gross weight from among lens gross weights of the focusing lens units in the plurality of imaging optical systems, and $LDW_{min}$ denotes a minimum lens gross weight from among lens gross weights of the focusing lens units in the plurality of imaging optical systems.

As aforementioned, according to the first arrangement and the second arrangement, it is possible to improve the imaging magnification of the focusing lens unit. Moreover, since the focusing sensitivity is improved by the imaging magnification of the focusing lens unit being improved, it is possible to reduce the moving distance of the focusing lens unit. Furthermore, it is possible to make the focusing lens unit small-sized and light-weight. Moreover, by the focusing lens unit being disposed at the position where a light beam is converged, it is possible to make the focusing lens unit small-sized and light-weight. By disposing the diaphragm member near the focusing lens unit, small-sizing of the diaphragm member is possible.

In such manner, in the plurality of imaging optical systems according to the present embodiment, it is possible to reduce the moving distance of the focusing lens unit as well as to make the diaphragm member small. As a result, it is possible to narrow both, the space necessary for the movement of the focusing lens unit and the space for disposing the drive unit. Accordingly, in the plurality of imaging optical systems, realization of an arrangement of using at least the second drive actuator in common becomes easy.

Conditional expression (7) is a conditional expression regarding the gross weight of the focusing lens unit in the plurality of imaging optical systems, and is a conditional expression in which, a proportion of the maximum value of the gross weight and the minimum value of the gross weight is regulated.

When exceeding an upper limit value of conditional expression (7), in a case of using the second drive actuator in common, a degradation of focusing drive speed becomes substantial in the imaging optical system in which, the gross weight of the focusing lens unit is the maximum. Therefore, it is not preferable to exceed the upper limit of conditional expression (7).

It is more preferable that the following conditional expression (7)' is satisfied instead of conditional expression (7).

$$1 \leq LDW_{max}/LDW_{min} \leq 1.50 \qquad (7)'$$

Moreover, it is even more preferable that the following conditional expression (7)" is satisfied instead of conditional expression (7).

$$1 \leq LDW_{max}/LDW_{min} \leq 1.40 \qquad (7)''$$

Moreover, in the plurality of imaging optical systems according to the present embodiment, it is preferable that each imaging optical system satisfies the following conditional expression (8):

$$-2<f_{fc}/f_{fb}<-0.27 \qquad (8)$$

where, $f_{fc}$ denotes a focal length of the focusing lens unit in each imaging optical system, and $f_{fb}$ denotes a focal length of the rear lens unit in each imaging optical system.

Conditional expression (8) is a conditional expression in which, a proportion of the focal length of the focusing lens unit and the focal length of the rear lens units is regulated, and is a conditional expression in which, a balance of aberration and the refractive power borne by the rear lens unit in particular, has been taken into consideration.

When falling below a lower limit value of conditional expression (8), the focusing sensitivity becomes excessively weak. In this case, since a space in which the focusing lens unit is to be disposed increases, small-sizing of the optical system becomes difficult. Moreover, when exceeding an upper limit value of conditional expression (8), since it is not possible to achieve sufficiently an aberration correction effect of the rear lens unit, the spherical aberration and the curvature of field in particular, are deteriorated.

It is more preferable that the following conditional expression (8)' is satisfied instead of conditional expression (8).

$$-1.7 < f_{fc}/f_{fb} < -0.3 \tag{8}'$$

Moreover, it is even more preferable that the following conditional expression (8)" is satisfied instead of conditional expression (8).

$$-1.5 < f_{fc}/f_{fb} < -0.3 \tag{8}''$$

Moreover, in the plurality of imaging optical system according to the present embodiment, it is preferable that a positive lens among the common lenses satisfies the following conditional expression (9):

$$80 < \mathrm{v d}_P \tag{9}$$

where, $\mathrm{vd}_P$ denotes Abbe's number for the positive lens among the common lenses.

By satisfying conditional expression (9), in a common design of each imaging optical system, it is possible to secure a favorable chromatic aberration. In a case in which, the positive lenses are in plurality, it is preferable that one of the positive lenses satisfies conditional expression (9).

Moreover, in the plurality of imaging optical systems according to the present embodiment, it is preferable that each imaging optical system satisfies the following conditional expression (10):

$$0.023 \le SC/L \le 0.110 \tag{10}$$

where,

SC denotes a distance from the diaphragm member in each imaging optical system up to a lens surface positioned on the object side of the focusing lens unit, and is a distance at the time of infinite object point focusing, and L denotes a total length of the optical system in each imaging optical system.

Conditional expression (10) is a conditional expression in which, a length from the diaphragm member up to a lens surface positioned on the object side, of the focusing lens has been regulated. In conditional expression (10), normalization is carried out by the overall length of the optical system. Moreover, a basis on the diaphragm member side for calculating SC becomes a member that determines the F-number from among members included in the diaphragm member.

When falling below a lower limit value of conditional expression (10), a sufficient convergence effect of converging a light beam by the refractive power of a lens unit positioned on the object side of the diaphragm (diaphragm member) cannot be achieved. Therefore, the diameter of the focusing lens unit becomes large. When exceeding an upper limit value of conditional expression (10), making the diameter of the focusing lens unit small becomes easy but, shortening the overall length of the optical system becomes difficult.

It is more preferable that the following conditional expression (10)' is satisfied instead of conditional expression (10).

$$0.025 \le SC/L \le 0.100 \tag{10}'$$

Moreover, it is even more preferable that the following conditional expression (10)" is satisfied instead of conditional expression (10).

$$0.040 \le SC/L \le 0.090 \tag{10}''$$

Moreover, in the plurality of imaging optical systems according to the present embodiment, it is preferable that each imaging optical system satisfies the following conditional expression (11).

$$0.2 \le SC/AP\Phi \le 1.0 \tag{11}$$

where,

SC denotes a distance from the diaphragm member in each imaging optical system up to a lens surface positioned on the object side of the focusing lens unit, and is a distance at the time of infinite object point focusing, and AP$\Phi$ denotes a diameter of an aperture stop in each imaging optical system.

Conditional expression (11) is a conditional expression in which, a length from the diaphragm member up to the lens surface positioned at the object side of the focusing lens unit is regulated. In conditional expression (11), normalization is carried out by the diameter of the aperture stop.

When falling below a lower limit value of conditional expression (11), it is not possible to achieve sufficiently, an effect of convergence of a light beam due to the positive refractive power of a lens unit positioned on the object side of the diaphragm. Therefore, the diameter of the focusing lens unit becomes large. Moreover, when exceeding an upper limit value of conditional expression (11), making the diameter of the focusing lens unit small becomes easy, but shortening the overall length of the optical system becomes difficult.

It is more preferable that the following conditional expression (11)' is satisfied instead of conditional expression (11).

$$0.30 \le SC/AP\Phi \le 0.95 \tag{11}'$$

Moreover, it is even more preferable that the following conditional expression (11)" is satisfied instead of conditional expression (11).

$$0.45 \le SC/AP\Phi \le 0.80 \tag{11}''$$

Moreover, in the plurality of imaging optical systems according to the present embodiment, it is preferable that two imaging optical systems from among the plurality of imaging optical systems satisfy the following conditional expression (12).

$$1.2 < f_L/f_S \tag{12}$$

where, $f_L$ denotes a long focal length from among focal lengths at the time of infinite object point focusing of the overall system of the two imaging optical systems, and $f_S$ denotes a short focal length from among focal lengths at the time of infinite object point focusing of the overall system of the two imaging optical systems.

Conditional expression (12) is a conditional expression in which, a proportion of focal lengths in two arbitrary imaging optical systems from among the plurality of imaging optical systems is regulated.

When falling below a lower limit value of conditional expression (12), it is not possible to achieve effective specifications in each of the two imaging optical systems.

Moreover, in the plurality of imaging optical systems according to the second embodiment, it is preferable that each imaging optical system includes an identical diaphragm member.

In the plurality of imaging optical systems according to the second embodiment, each imaging optical system includes an identical focusing unit. Therefore, even regarding the diaphragm member, by including the identical diaphragm member, it is possible to make large the number of identical components, or in other words, the components that can be used in common in the plurality imaging optical systems. As a result, it is possible to reduce substantially a manufacturing cost of each imaging optical system.

Moreover, in the plurality of imaging optical systems according to the present embodiment, it is preferable that a diameter of an aperture stop of the diaphragm member in each imaging optical system is let to be $AP\Phi_{max}$, where, $AP\Phi_{max}$ denotes the maximum diameter from among the diameters of the aperture stops in the plurality of imaging optical systems.

While using the diaphragm member commonly in the plurality of imaging optical systems, the diameter of the aperture stop in each imaging optical system is let to be a diameter that is the maximum among the diameters of the aperture stops in the plurality of imaging optical systems. Moreover, for an imaging optical system that needs opening diameter smaller than $AP\Phi_{max}$, an opening member having an opening diameter smaller than $AP\Phi_{max}$ is used. In this case, it is preferable to use a member such as a diaphragm blade as an opening member, and to realize opening diameter smaller than $AP\Phi_{max}$ by narrowing the opening diameter by the member such as the diaphragm blade, for example. By doing so, it is possible to arrange the diaphragm member efficiently. In a case of using two opening members, a combination of a fixed opening and a variable opening and a combination of two variable openings are presumable.

Moreover, in the plurality of imaging optical systems according to the present embodiment, it is preferable that in an imaging optical system with an optical diaphragm diameter smaller than $AP\Phi_{max}$ of the diaphragm member, setting of the optical diaphragm is carried out by diaphragm blades narrowed down to an F-number at maximum aperture, and the number of diaphragm blades is an odd number not less than seven.

By letting the number of diaphragm blades to be not less than seven, it is possible to form a shape of the opening at maximum aperture by the diaphragm blades to be close to a perfect circular shape. Moreover, by letting the number of diaphragm blades to be an odd number not less than seven, it is possible to reduce diffraction intensity due to the shape of the opening.

Moreover, in the plurality of imaging optical systems according to the present embodiment, it is preferable that in the imaging optical system with an optical diaphragm diameter smaller than $AP\Phi_{max}$ of an identical diaphragm member, a light shielding member having a circular opening section is disposed additionally near a diaphragm frame member such that, an F-number at maximum aperture becomes a predetermined F-number.

By adopting such arrangement, it is possible to let a shape of the opening at maximum aperture closer to be perfect circular shaped.

Moreover, an image pickup apparatus according to the present embodiment includes an imaging optical system, and an image pickup element which has an image pickup surface, and which converts an image formed on the image pickup surface by the imaging optical system, to an electric signal, and the imaging optical system is one of the plurality of imaging optical systems described heretofore.

According to the image pickup apparatus of the present embodiment, since it is possible to use the plurality of imaging optical systems according to the present embodiment, it is possible to capture images of various objects while being small-sized and light-weight.

The abovementioned arrangements satisfy the plurality of arrangements simultaneously. This is preferable for achieving a favorable plurality of imaging optical systems. Moreover, combinations of preferable arrangements are arbitrary. For each conditional expression, only an upper limit value and a lower limit value of a numerical range of a conditional expression further restricted, may be restricted.

Examples of the plurality of imaging optical systems according to the present embodiments will be described below in detail by referring to the accompanying diagrams. However, the present invention is not restricted to the examples described below.

Moreover, for cutting unnecessary light such as ghost and flare, a flare aperture may be disposed apart from the aperture stop. The flare aperture may be disposed at any of locations namely, on the object side of the front lens unit, between the front lens unit and the focusing lens unit, between the focusing lens unit and the rear lens unit, and between the rear lens unit and the image plane.

An arrangement may be made such that a frame member is used as a light shielding portion of the flare aperture, or some other member may be used as the light shielding portion. Moreover, the light shielding portion may be printed directly on the optical system, or may be painted directly on the optical system. Moreover, a seal etc. may be stuck directly on the optical system as the light shielding portion.

A shape of the shielding portion may be any shape such as a circular shape, an elliptical shape, a rectangular shape, a polygonal shape, and a range surrounded by a function curve. Not only unnecessary light beam but also a light beam such as coma flare around a screen may be cut.

The ghost and the flare may be reduced by applying an antireflection coating on each lens. A multilayer coating is desirable as it enables to reduce the ghost and the flare effectively. Moreover, infrared-cutting coating may be applied to lens surfaces and the cover glass.

For preventing the occurrence of the ghost and the flare, generally, the antireflection coating is applied to a surface of a lens in contact with air. On the other hand, at a cemented surface of a cemented lens, a refractive index of an adhesive is sufficiently higher than a refractive index of air. Therefore, in many cases, a reflectance is originally of the level of a single-layer coating or lower. Therefore, coating is applied to a cemented surface of a cemented lens only in few cases. However, when the antireflection coating is applied positively even to the cemented surface, it is possible to reduce further the ghost and the flare. Therefore, it is possible to achieve a more favorable image.

Particularly, recently, a glass material having a high refractive index has been used widely. The glass material having a high refractive index, being highly effective in aberration correction, has been used widely in an optical system of cameras. However, when the glass material having a high refractive index is used as a cemented lens, even a reflection at the cemented surface becomes unignorable. In such a case, applying the antireflection coating on the cemented surface is particularly effective.

An effective usage of the cemented-surface coating has been disclosed in Japanese Patent Application Laid-open Publication Nos. Hei 2-27301, No. 2001-324676, No. 2005-92115, and U.S. Pat. No. 7,116,482.

In these patent literatures, a cemented lens surface coating in a first lens unit of a positive-lead zoom lens in particular, has been described. It is preferable to apply the cemented surface coating to the cemented lens surface in the front lens unit having a positive refractive power as it has been disclosed in these patent literatures.

As a coating material to be used, according to a refractive index of the adhesive material and a refractive index of the lens which is abase, coating materials such as $Ta_2O_5$, $TiO_2$, $Nb_2O_5$, $ZrO_2$, $HfO_2$, $CeO_2$, $SnO_2$, $In_2O_3$, ZnO, and $Y_2O_3$ having a comparatively higher refractive index, and coating materials such as $MgF_2$, $SiO_2$, and $Al_2O_3$ having a comparatively lower refractive index maybe selected appropriately, and set to a film thickness that satisfies phase conditions.

Naturally, similar to the coating on the surface of the lens in contact with air, the coating on the cemented surface may also be let to be a multilayer coating. By combining appropriately a film thickness and a coating material of number of films not less than in two layers, it is possible to reduce further the reflectance, and to control spectral characteristics and angular characteristics of reflectance. Moreover, it is needless to mention that for the cemented surface of lenses other than the lenses in the front lens unit, it is effective to apply the coating on the cemented surface based on a similar idea.

A plurality of imaging optical systems according to an example 1 includes an imaging optical system according to an example A, an imaging optical system according to an example B, an imaging optical system according to an example C, and an imaging optical system according to an example D.

A plurality of imaging optical systems according to an example 2 includes the imaging optical system according to the example A, the imaging optical system according to the example B, and the imaging optical system according to the example C.

An imaging optical system according to an example 3 includes the imaging optical system according to the example B and the imaging optical system according to the example C.

The imaging optical system according to the example A will be described below. FIG. 1 is a cross-sectional view (lens cross-sectional view) along an optical axis showing an optical arrangement at the time of infinite object point focusing of the imaging optical system according to the example A. In all of the example A, the example B, the example C, and the example D, a front lens unit is denoted by GF, a focusing lens unit is denoted by Fo, a rear lens unit is denoted by GR, an aperture stop is denoted by S, and an image plane (image pickup surface) is denoted by I.

FIG. 2A, FIG. 2B, FIG. 2C, FIG. 2D, FIG. 2E, FIG. 2F, FIG. 2G, and FIG. 2H are aberration diagrams of the imaging optical system according to the example A. Here, FIY denotes an image height. Reference numerals in aberration diagrams are same in the example B, the example C, and the example D that will be described later.

Moreover, in these aberration diagrams, FIG. 2A, FIG. 4A, FIG. 6A and FIG. 8A show a spherical aberration (SA) at the time of infinite object point focusing, FIG. 2B, FIG. 4B, FIG. 6B, and FIG. 8B show an astigmatism (AS) at the time of infinite object point focusing, FIG. 2C, FIG. 4C, FIG. 6C, and FIG. 8C show a distortion (DT) at the time of infinite object point focusing, and FIG. 2D, FIG. 4D, FIG. 6D, and FIG. 8D show a chromatic aberration of magnification (CC) at the time of infinite object point focusing.

Moreover, FIG. 2E, FIG. 4E, FIG. 6E, and FIG. 8E show a spherical aberration (SA) at the time of focusing to a close object point, FIG. 2F, FIG. 4F, FIG. 6F, and FIG. 8F show an astigmatism (AS) at the time of focusing to a close object point, FIG. 2G, FIG. 4G, FIG. 6G, and FIG. 8G show a distortion (DT) at the time of focusing to a close object point, and FIG. 2H, FIG. 4H, FIG. 6H, and FIG. 8H show a chromatic aberration of magnification (CC) at the time of focusing to a close object point.

The imaging optical system according to the example A, as shown in FIG. 1, includes in order from an object side to an image side, a front lens unit GF having a positive refractive power, a focusing lens unit Fo having a negative refractive power, and a rear lens unit GR having a positive refractive power. An aperture stop S is disposed between the front lens unit GF and the focusing lens unit Fo.

The front lens unit GF includes a positive meniscus lens L1 having a convex surface directed toward the object side, a positive meniscus lens L2 having a convex surface directed toward the object side, a negative meniscus lens L3 having a convex surface directed toward the object side, a positive meniscus lens L4 having a convex surface directed toward the object side, a biconvex positive lens L5, and a biconcave negative lens L6. Here, the negative meniscus lens L3 and the positive meniscus lens L4 are cemented. Moreover, the biconvex positive lens L5 and the biconcave negative lens L6 are cemented.

The focusing lens unit Fo includes a positive meniscus lens L7 having a convex surface directed toward the image side, and a biconcave negative lens L8. Here, the positive meniscus lens L7 and the biconcave negative lens L8 are cemented.

The rear lens unit GR includes a negative meniscus lens L9 having a convex surface directed toward the object side, and a biconvex positive lens L10.

At the time of focusing, the focusing lens unit Fo moves along an optical axis. More elaborately, at the time of focusing from an object at infinity to a close object, the focusing lens unit Fo moves toward the image side.

Figure 3:
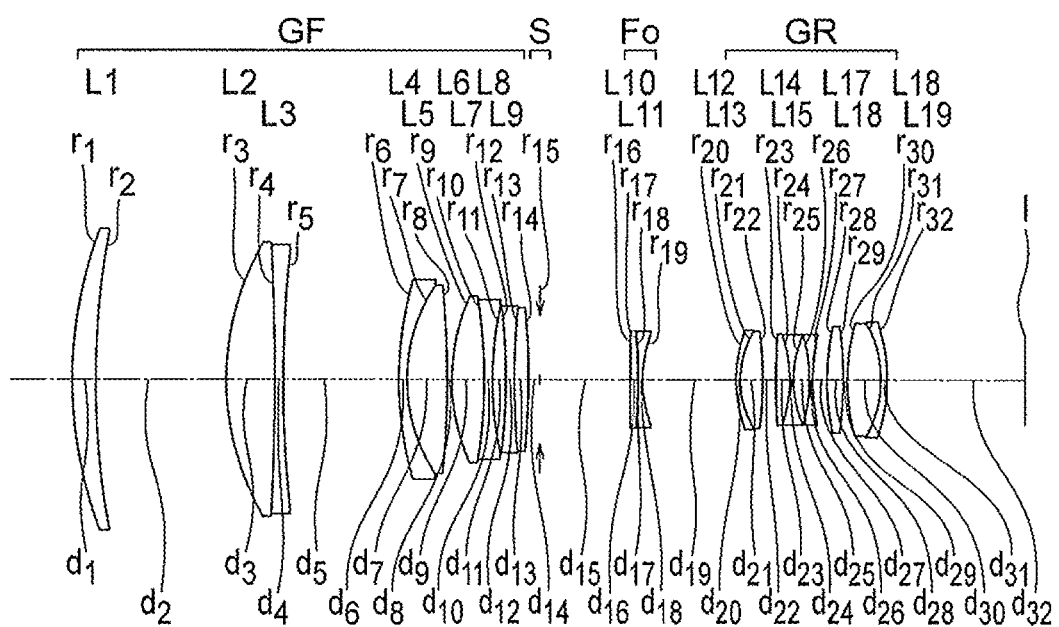
FIG. 3 is a cross-sectional view along an optical axis showing an optical arrangement of an imaging optical system according to an example B at the time of focusing to an infinite object point.

The imaging optical system according to the example B will be described below. FIG. 3 is a cross-sectional view along an optical axis showing an optical arrangement at the time of infinite object point focusing of the imaging optical system according to the example B. FIG. 4A, FIG. 4B, FIG. 4C, FIG. 4D, FIG. 4E, FIG. 4F, FIG. 4G, and FIG. 4H are aberration diagrams at the time of infinite object point focusing of the example B and at the time of focusing to a close object point of the example B.

The imaging optical system according to the example B, as shown in FIG. 3, includes in order from an object side to an image side, a front lens unit GF having a positive refractive power, a focusing lens unit Fo having a negative refractive power, and a rear lens unit GR having a positive refractive power. An aperture stop S is disposed between the front lens unit GF and the focusing lens unit Fo.

The front lens unit GF includes a positive meniscus lens L1 having a convex surface directed toward the object side, a biconvex positive lens L2, a biconcave negative lens L3, a negative meniscus lens L4 having a convex surface directed toward the object side, a biconvex positive lens L5, a biconvex positive lens L6, a biconcave negative lens L7, a biconcave negative lens L8, and a biconvex positive lens L9. Here, the biconvex positive lens L2 and the biconcave negative lens L3 are cemented. Moreover, the negative meniscus lens L4 and the biconvex positive lens L5 are cemented. Furthermore, the biconvex positive lens L6 and the biconcave negative lens L7 are cemented. The biconcave negative lens L8 and the biconvex positive lens L9 are cemented.

The focusing lens unit Fo includes a positive meniscus lens L10 having a convex surface directed toward the image side, and a biconcave negative lens L11.

The rear lens unit GR includes a negative meniscus lens L12 having a convex surface directed toward the object side, a biconvex positive lens L13, a biconvex positive lens L14, a biconcave negative lens L15, a biconcave negative lens L16, a biconvex positive lens L17, a biconvex positive lens L18, and a negative meniscus lens L19 having a convex surface directed toward the image side. Here, the negative meniscus lens L12 and the biconvex positive lens L13 are cemented. Moreover, the biconvex positive lens L14 and the biconcave negative lens L15 are cemented. Furthermore, the biconvex positive lens L18 and the negative meniscus lens L19 are cemented.

At the time of focusing, the focusing lens unit Fo moves along the optical axis. More elaborately, at the time of focusing from an object at infinity to a close object, the focusing lens unit Fo moves toward the image side.

Figure 5:
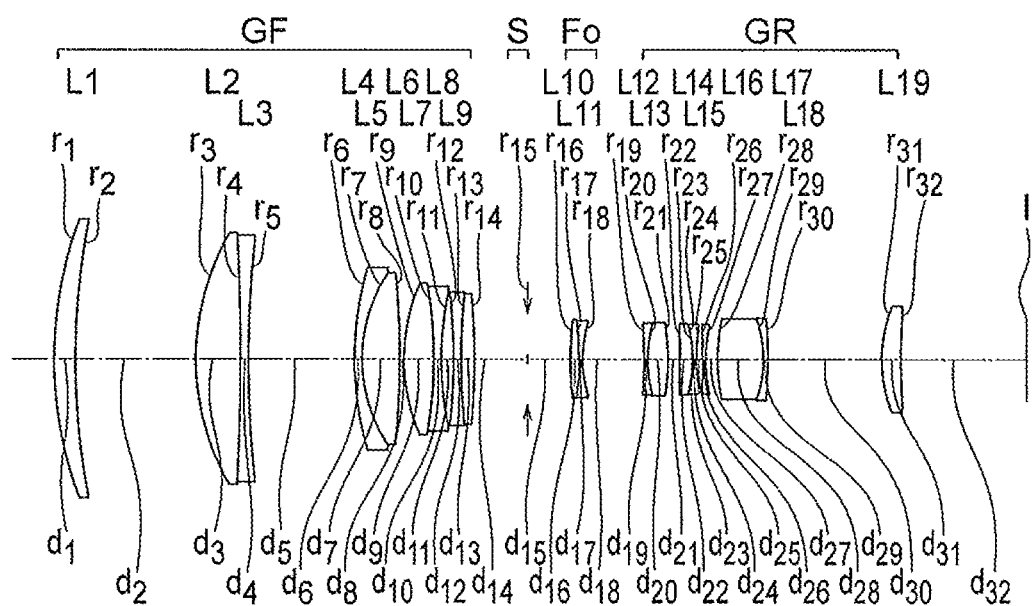
FIG. 5 is a cross-sectional view along an optical axis showing an optical arrangement of an imaging optical system according to an example C at the time of focusing to an infinite object point.

Next, the imaging optical system according to the example C will be described below. FIG. 5 is a cross-sectional view along an optical axis showing an optical arrangement at the time of infinite object point focusing of the imaging optical system according to the example C. FIG. 6A, FIG. 6B, FIG. 6C, FIG. 6D, FIG. 6E, FIG. 6F, FIG. 6G, and FIG. 6H are aberration diagrams at the time of infinite object point focusing of the example B and at the time of focusing to a close object point of the example C.

The imaging optical system according to the example C, as shown in FIG. 5, includes in order from an object side to an image side, a front lens unit GF having a positive refractive power, a focusing lens unit Fo having a negative refractive power, and a rear lens unit GR having a positive refractive power. An aperture stop S is disposed between the front lens unit GF and the focusing lens unit Fo.

The front lens unit GF includes a positive meniscus lens L1 having a convex surface directed toward the object side, a biconvex positive lens L2, a biconcave negative lens L3, a negative meniscus lens L4 having a convex surface directed toward the object side, a biconvex positive lens L5, a biconvex positive lens L6, a biconcave negative lens L7, a biconcave negative lens L8, and a biconvex positive lens L9. Here, the biconvex positive lens L2 and the biconcave negative lens L3 are cemented. Moreover, the negative meniscus lens L4 and the biconvex positive lens L5 are cemented. Furthermore, the biconvex positive lens L6 and the biconcave negative lens L7 are cemented. The biconcave negative lens L8 and the biconvex positive lens L9 are cemented. The front lens unit GF of the example C and the front lens unit GF of the example B are identical.

The focusing lens unit Fo includes a biconvex positive lens L10 and a biconcave negative lens L11. Here, the biconvex positive lens L10 and the biconcave negative lens L11 are cemented.

The rear lens unit GR includes a biconcave negative lens L12, a biconvex positive lens L13, a positive meniscus lens L14 having a convex surface directed toward the image side, a biconcave negative lens L15, a biconcave negative lens L16, a biconvex positive lens L17, a negative meniscus lens L18 having a convex surface directed toward the image side, and a positive meniscus lens L19 having a convex surface directed toward the object side. Here, the biconcave negative lens L12 and the biconvex positive lens L13 are cemented. Moreover, the positive meniscus lens L14 and the biconcave negative lens L15 are cemented. Furthermore, the biconvex positive lens L17 and the negative meniscus lens L18 are cemented.

At the time of focusing, the focusing lens unit Fo moves along the optical axis. More elaborately, at the time of focusing from an object at infinity to a close object, the focusing lens unit Fo moves toward the image side.

Figure 7:
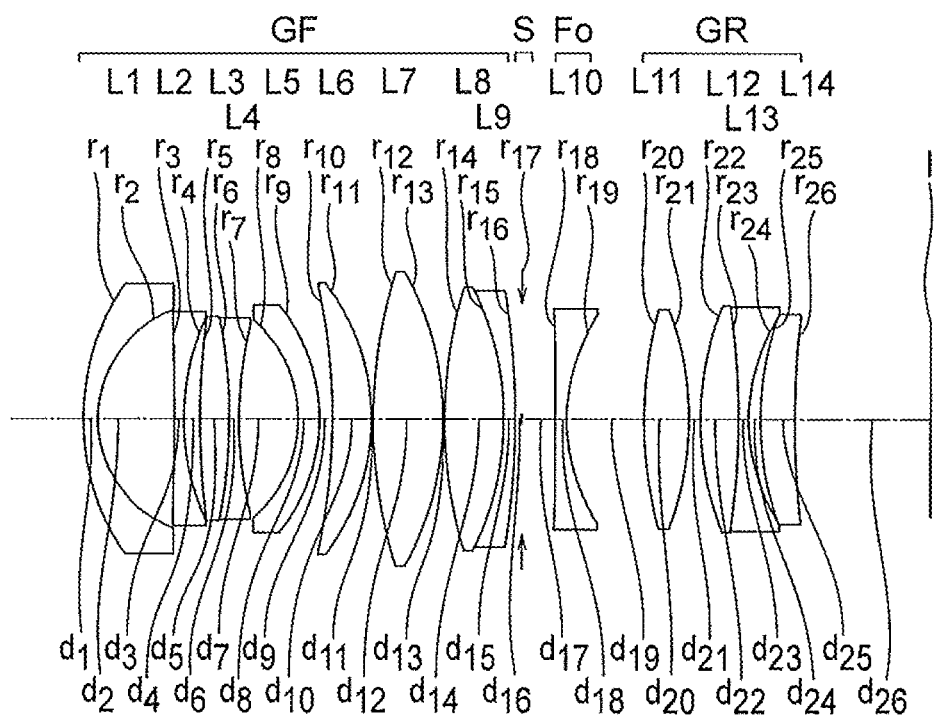
FIG. 7 is a cross-sectional view along an optical axis showing an optical arrangement of an imaging optical system according to an example D at the time of focusing to an infinite object point.

Next, the imaging optical system according to the example D will be described below. FIG. 7 is a cross-sectional view along an optical axis show in an optical arrangement at the time of infinite object point focusing of the imaging optical system according to the example D. FIG. 8A, FIG. 8B, FIG. 8C, FIG. 8D, FIG. 8E, FIG. 8F, FIG. 8G, and FIG. 8H are aberration diagrams at the time of infinite object point focusing according to the example D and aberration diagrams at the time of focusing to a close object point according to the example D.

The imaging optical system according to the example D, as shown in FIG. 7, includes in order from an object side to an image side, a front lens unit GF having a positive refractive power, a focusing lens unit Fo having a negative refractive power, and a rear lens unit GR having a positive refractive power. An aperture stop S is disposed between the front lens unit GF and the focusing lens unit Fo.

The front lens unit GF includes a negative meniscus lens L1 having a convex surface directed toward the object side, a biconcave negative lens L2, a biconvex positive lens L3, a biconcave negative lens L4, a negative meniscus lens L5 having a convex surface directed toward the image side, a positive meniscus lens L6 having a convex surface directed toward the image side, a biconvex positive lens L7, a biconvex positive lens L8, and a negative meniscus lens L9 having a convex surface directed toward the image side. Here, the biconvex positive lens L3 and the biconcave negative lens L4 are cemented. Moreover, the biconvex positive lens L8 and the negative meniscus lens L9 are cemented.

The focusing lens unit Fo includes a negative meniscus lens L10 having a convex surface directed toward the object side.

The rear lens unit GR includes a biconvex positive lens L11, a biconvex positive lens L12, a biconcave negative lens L13, and a positive meniscus lens L14 having a convex surface directed toward the object side. Here, the biconvex positive lens L12 and the biconcave negative lens L13 are cemented.

At the time of focusing, the focusing lens unit Fo moves toward an optical axis. More elaborately, at the time of focusing from an object at infinity to a close object, the focusing lens unit Fo moves toward the image side.

An aspheric surface is provided to a total of four surfaces namely, both surfaces of the biconcave negative lens 12 and both surfaces of the negative meniscus lens L10.

Numerical data of example A, example B, example C and example D are shown below. Apart from symbols described above, r denotes radius of curvature of each lens surface, d denotes a distance between respective lens surfaces, nd denotes a refractive index of each lens for a d-line, vd denotes an Abbe number for each lens and * denotes an aspheric surface. Further, f denotes a focal length of the entire imaging optical system, FNO. denotes an F number, ω denotes a half angle of view, FB denotes a back focus. FB is a unit which is expressed upon air conversion of a distance from the lens backmost surface to a paraxial image surface. Further, "Infinite" denotes at the time focusing to an infinite object point, and "close" denotes at the time of focusing to a close object point. Value described on the side of "Close" denotes distance to the object point.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'e-n' (where, n is an integral number) indicates '10$^{-n}$'. Moreover, these symbols are commonly used in the following numerical data for each example.

EXAMPLE A

Unit mm

Surface data

| Surface no. | r | d | nd | vd |
|---|---|---|---|---|
| Object plane | ∞ | ∞ | | |
| 1 | 126.986 | 6.449 | 1.48749 | 70.23 |
| 2 | 679.711 | 2.000 | | |
| 3 | 52.008 | 10.412 | 1.49700 | 81.54 |
| 4 | 133.435 | 18.710 | | |
| 5 | 72.403 | 2.000 | 1.77250 | 49.60 |
| 6 | 30.114 | 11.959 | 1.49700 | 81.61 |
| 7 | 1931.805 | 1.100 | | |
| 8 | 46.268 | 8.500 | 1.49700 | 81.61 |
| 9 | −90.298 | 2.000 | 1.69680 | 55.53 |
| 10 | 50.008 | 10.555 | | |
| 11 (Stop) | ∞ | Variable | | |
| 12 | −272.027 | 2.100 | 1.84666 | 23.78 |
| 13 | −58.125 | 1.000 | 1.65412 | 39.68 |
| 14 | 33.116 | Variable | | |
| 15 | 156.817 | 1.000 | 1.78470 | 26.29 |
| 16 | 59.134 | 15.500 | | |
| 17 | 67.376 | 4.264 | 1.83400 | 37.16 |
| 18 | −111.407 | | | |
| Image plane | ∞ | | | |

Various data

| | Infinite | Close (1.4 m) |
|---|---|---|
| f | 195.998 | 189.768 |
| FNO. | 3.177 | 3.61 |
| 2ω | 6.3 | |
| FB | 35.658 | 35.658 |
| d11 | 11.000 | 24.804 |
| d14 | 23.680 | 9.876 |

EXAMPLE B

Unit mm

Surface data

| Surface no. | r | d | nd | vd |
|---|---|---|---|---|
| Object plane | ∞ | ∞ | | |
| 1 | 105.798 | 5.500 | 1.48749 | 70.23 |
| 2 | 192.463 | 31.336 | | |
| 3 | 67.537 | 11.600 | 1.49700 | 81.54 |
| 4 | −650.917 | 2.000 | 1.73400 | 51.47 |
| 5 | 292.344 | 27.708 | | |
| 6 | 86.044 | 2.000 | 1.83400 | 37.16 |
| 7 | 41.513 | 9.800 | 1.48749 | 70.23 |
| 8 | −234.925 | 1.115 | | |
| 9 | 49.500 | 7.900 | 1.43875 | 94.93 |
| 10 | −120.588 | 2.000 | 1.75500 | 52.32 |
| 11 | 85.250 | 3.176 | | |
| 12 | −159.120 | 2.000 | 1.80440 | 39.59 |
| 13 | 185.280 | 3.500 | 1.80810 | 22.76 |
| 14 | −182.761 | 2.755 | | |
| 15 (Stop) | ∞ | Variable | | |
| 16 | 1235.721 | 1.800 | 1.84666 | 23.78 |
| 17 | −129.241 | 0.100 | | |
| 18 | −129.241 | 1.000 | 1.71300 | 53.87 |
| 19 | 32.003 | Variable | | |
| 20 | 35.348 | 1.000 | 1.92286 | 18.90 |
| 21 | 23.584 | 5.300 | 1.53996 | 59.46 |
| 22 | −95.147 | 3.100 | | |
| 23 | 210.359 | 3.300 | 1.84666 | 23.78 |
| 24 | −34.267 | 0.900 | 1.77250 | 49.60 |
| 25 | 26.998 | 3.917 | | |
| 26 | −40.458 | 0.800 | 1.72916 | 54.68 |
| 27 | 52.932 | 3.300 | | |
| 28 | 64.666 | 3.850 | 1.72047 | 34.71 |
| 29 | −94.366 | 1.022 | | |
| 30 | 53.290 | 8.100 | 1.56732 | 42.82 |
| 31 | −28.431 | 1.500 | 1.92286 | 18.90 |
| 32 | −43.962 | | | |
| Image plane | ∞ | | | |

Various data

| | Infinite | Close (1.4 m) |
|---|---|---|
| f | 294.894 | 214.374 |
| FNO. | 4.141 | 4.59 |
| 2ω | 4.2 | |
| FB | 33.351 | 33.351 |
| d15 | 21.854 | 39.925 |
| d19 | 22.511 | 4.439 |

EXAMPLE C

Unit mm

Surface data

| Surface no. | r | d | nd | vd |
|---|---|---|---|---|
| Object plane | ∞ | ∞ | | |
| 1 | 105.798 | 5.500 | 1.48749 | 70.23 |
| 2 | 192.463 | 31.336 | | |
| 3 | 67.537 | 11.600 | 1.49700 | 81.54 |
| 4 | −650.917 | 2.000 | 1.73400 | 51.47 |
| 5 | 292.344 | 27.708 | | |
| 6 | 86.044 | 2.000 | 1.83400 | 37.16 |
| 7 | 41.513 | 9.800 | 1.48749 | 70.23 |
| 8 | −234.925 | 1.115 | | |
| 9 | 49.500 | 7.900 | 1.43875 | 94.93 |
| 10 | −120.588 | 2.000 | 1.75500 | 52.32 |
| 11 | 85.250 | 3.176 | | |
| 12 | −159.120 | 2.000 | 1.80440 | 39.59 |
| 13 | 185.280 | 3.500 | 1.80810 | 22.76 |
| 14 | −182.761 | 13.755 | | |
| 15 (Stop) | ∞ | Variable | | |
| 16 | 101.605 | 2.200 | 1.69895 | 30.13 |
| 17 | −89.326 | 1.000 | 1.81600 | 46.62 |
| 18 | 34.780 | Variable | | |
| 19 | −144.791 | 1.000 | 1.92286 | 18.90 |
| 20 | 38.776 | 5.300 | 1.84666 | 23.78 |
| 21 | −59.700 | 3.100 | | |
| 22 | −328.811 | 3.300 | 1.84666 | 23.78 |
| 23 | −34.760 | 0.100 | | |
| 24 | −34.760 | 0.900 | 1.77250 | 49.60 |
| 25 | 55.939 | 1.692 | | |
| 26 | −199.510 | 0.800 | 1.77250 | 49.60 |
| 27 | 46.239 | 3.000 | | |
| 28 | 51.079 | 12.000 | 1.64769 | 33.79 |
| 29 | −32.908 | 1.200 | 1.84666 | 23.78 |
| 30 | −119.520 | 29.615 | | |
| 31 | 37.374 | 5.000 | 1.51633 | 64.14 |
| 32 | 226.417 | | | |
| Image plane | ∞ | | | |

-continued

Unit mm

Various data

|  | Infinite | Close (1.4 m) |
|---|---|---|
| f | 392.014 | 345.512 |
| FNO. | 5.681 | 6.10 |
| 2ω | 3.2 | |
| FB | 32.938 | 32.938 |
| d15 | 11.280 | 21.348 |
| d18 | 16.121 | 6.053 |

EXAMPLE D

Unit mm

Surface data

| Surface no. | r | d | nd | vd |
|---|---|---|---|---|
| Object plane | ∞ | ∞ | | |
| 1 | 25.254 | 1.500 | 1.48749 | 70.23 |
| 2 | 12.200 | 7.696 | | |
| 3* | −316.050 | 1.000 | 1.49700 | 81.54 |
| 4* | 25.646 | 1.645 | | |
| 5 | 81.831 | 2.949 | 1.90366 | 31.32 |
| 6 | −54.137 | 1.000 | 1.43700 | 95.10 |
| 7 | 41.580 | 6.025 | | |
| 8 | −13.671 | 2.192 | 2.00069 | 25.46 |
| 9 | −18.688 | 1.336 | | |
| 10 | −64.491 | 3.960 | 1.72916 | 54.68 |
| 11 | −23.230 | 0.200 | | |
| 12 | 50.703 | 7.172 | 1.49700 | 81.61 |
| 13 | −31.464 | 0.200 | | |
| 14 | 47.122 | 6.059 | 1.49700 | 81.61 |
| 15 | −30.236 | 1.200 | 2.00069 | 25.46 |
| 16 | −81.845 | 0.700 | | |
| 17 (Stop) | ∞ | Variable | | |
| 18* | 760.015 | 1.201 | 1.49700 | 81.54 |
| 19* | 18.926 | Variable | | |
| 20 | 43.543 | 4.541 | 1.49700 | 81.61 |
| 21 | −32.595 | 1.200 | | |
| 22 | 31.543 | 3.887 | 1.88300 | 40.76 |
| 23 | −79.658 | 1.000 | 1.73800 | 32.26 |
| 24 | 19.779 | 1.208 | | |
| 25 | 31.477 | 3.497 | 1.72916 | 54.68 |
| 26 | 98.075 | | | |
| Image plane | ∞ | | | |

Aspherical surface data

3rd surface k = 0.0000
A4 = 5.0113e−007, A6 = 1.2729e−008, A8 = 0.0000e+000,
A10 = 0.0000e+000

4th surface k = 0.0000
A4 = 3.6857e−006, A6 = −3.3589e−008, A8 = 0.0000e+000,
A10 = 0.0000e+000

18th surface k = 0.0000
A4 = −1.4818e−005, A6 = 0.0000e+000, A8 = 0.0000e+000,
A10 = 0.0000e+000

19th surface k = 0.0000
A4 = −1.0604e−005, A6 = −4.2279e−008, A8 = −6.9745e−011,
A10 = 0.0000e+000

-continued

Unit mm

Various data

|  | Infinit | Close (0.25 m) |
|---|---|---|
| f | 17.270 | 17.643 |
| FNO. | 1.230 | 1.31 |
| 2ω | 65.2 | |
| FB | 13.902 | 13.902 |
| d17 | 2.600 | 5.597 |
| d19 | 8.710 | 5.713 |

Next, values of conditional expressions (1) to (12) in each example are given below. '-' (hyphen) indicates that there is no corresponding arrangement. Values of conditional expression (12) in example 1 are shown in Table 1, values of conditional expression (12) in example 2 are shown in Table 2, and values of conditional expression (12) in example 3 are shown in Table 3.

|  | Example 1 | Example 2 | Example 3 |
|---|---|---|---|
| (2) $AP\Phi_{max}/AP\Phi_{min}$ | 1.04 | 1.03 | 1.01 |
| (3) $f_{foLA}/f_{foSM}$ | 1.45 | 1.16 | 1.16 |
| (4) $K_{max}/K_{min}$ | 41.49 | 1.42 | 1.12 |
| (7) $LDW_{max}/LDW_{min}$ | 1.53 | 1.33 | 1.33 |
| (12) $f_L/f_S$ | Table 1 | Table 2 | Table 3 |

TABLE 1

|  | Example A | Example B | Example C | Example D |
|---|---|---|---|---|
| Example A | — | 1.50 | 2.00 | 11.35 |
| Example B | — | — | 1.33 | 17.09 |
| Example C | — | — | — | 22.70 |
| Example D | — | — | — | — |

TABLE 2

|  | Example A | Example B | Example C |
|---|---|---|---|
| Example A | — | 1.50 | 2.00 |
| Example B | — | — | 1.33 |
| Example C | — | — | — |

TABLE 3

|  | Example B | Example C |
|---|---|---|
| Example B | — | 1.33 |
| Example C | — | — |

|  | Example A | Example B | Example C | Example D |
|---|---|---|---|---|
| (1) $f_{ff}/f_{fb}$ | 1.6 | 0.99 | 0.68 | 0.81 |
| (5) $\Phi_{LD}/\Phi_c$ | 1.16 | 1.07 | 1.11 | 1.00 |
| (6) $|f_{fo}/f|$ | 0.26 | 0.17 | 0.14 | 2.26 |
| (8) $f_{fo}/f_{fb}$ | −0.71 | −0.38 | −0.30 | −1.44 |
| (9) $vd_P$ | — | 81.54 | 81.54 | — |
| (10) SC/L | 0.066 | 0.095 | 0.044 | 0.039 |
| (11) SC/APΦ | 0.440 | 0.903 | 0.466 | 0.142 |
| APΦ | 25 | 24.2 | 24.2 | 23.98 |
| $f_{fo}$ | −51 | −48.7731 | −56.818 | −39.0742 |

-continued

|   | Example A | Example B | Example C | Example D |
|---|---|---|---|---|
| K | 7.416 | 9.387 | 10.496 | 0.253 |
| f | 196 | 294.89384 | 392.014 | 17.27 |

Figure 9:
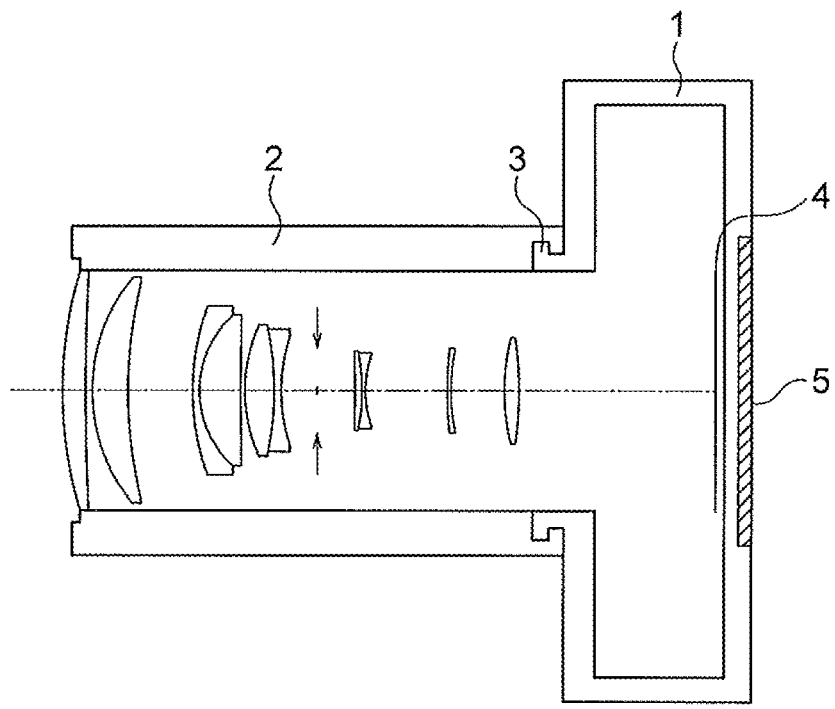
FIG. 9 is a cross-sectional view of an image pickup apparatus.

FIG. 9 is a cross-sectional view of a single-lens mirrorless camera as an electronic image pickup apparatus. In FIG. 9, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the imaging optical system described in any one of example A, example B, example C and example D is to be used.

Figure 10:
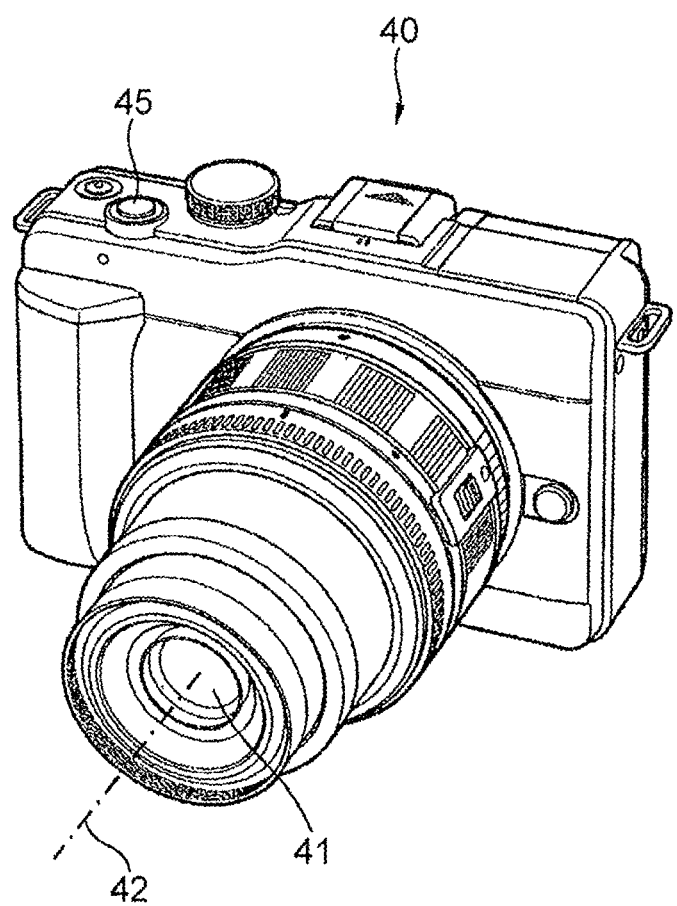
FIG. 10 is a front perspective view showing an appearance of the image pickup apparatus.
Figure 11:
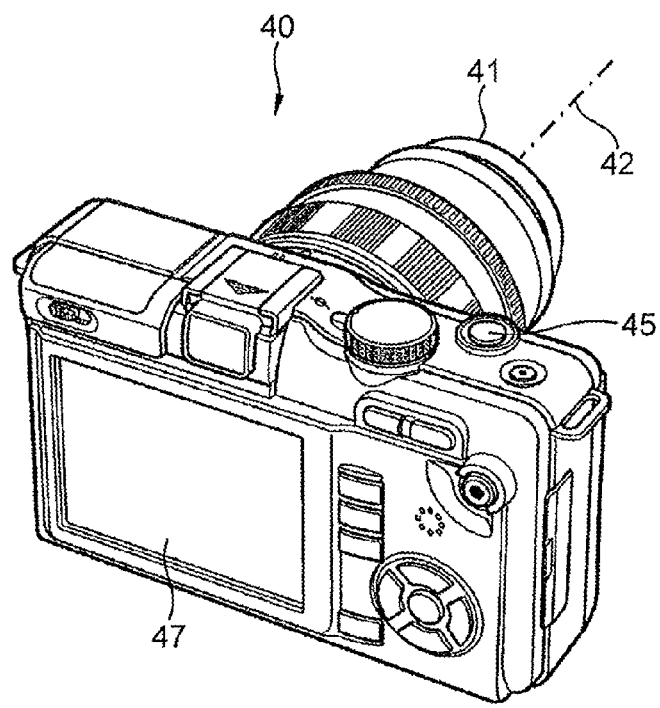
FIG. 11 is a rear perspective view of the image pickup apparatus.

FIG. 10 and FIG. 11 are conceptual diagrams of an arrangement of the image pickup apparatus. FIG. 10 is a front perspective view showing an appearance of a digital camera 40 as the image pickup apparatus, and FIG. 11 is a rear perspective view of the digital camera 40. The imaging optical system according to any one of example A, example B, example C, and example D is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the imaging optical system according to the example A. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 12:
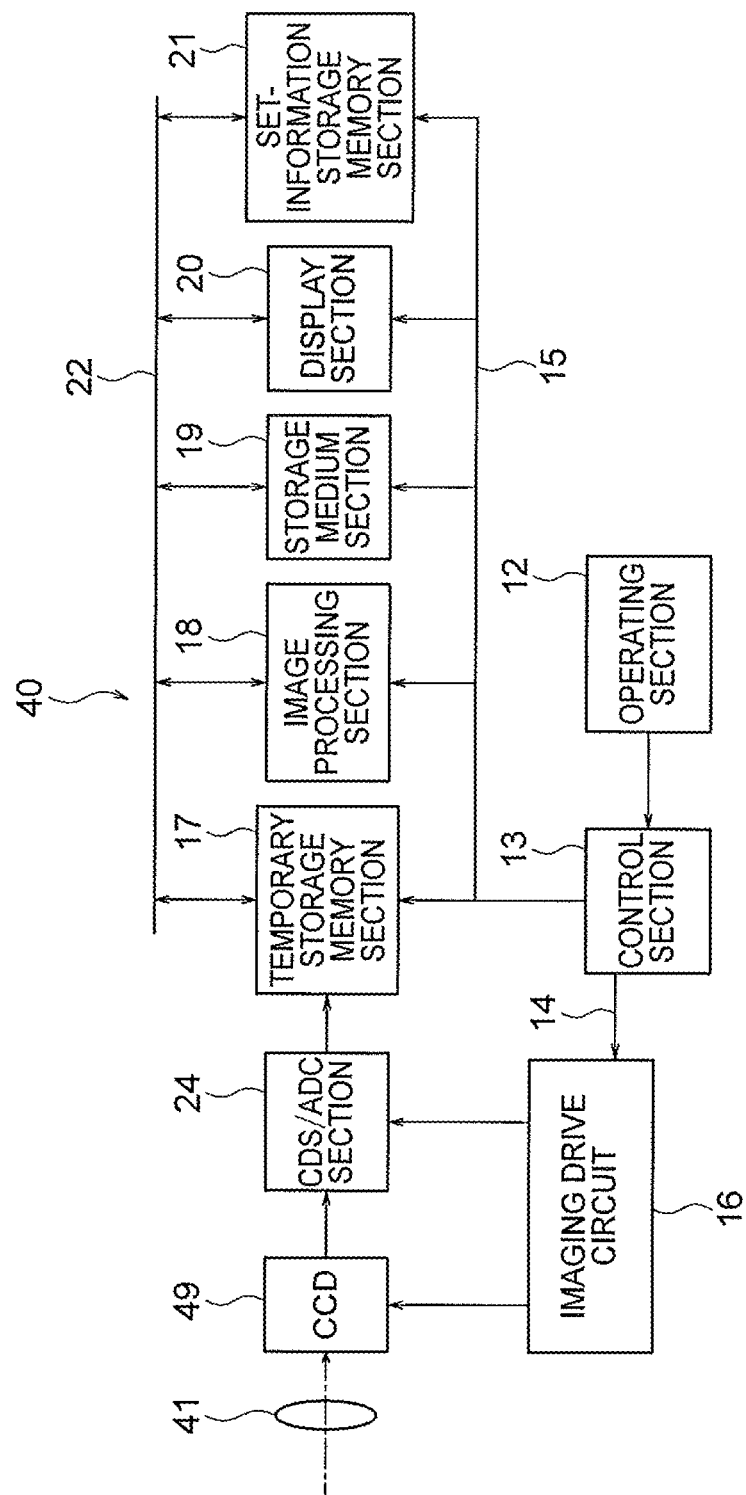
FIG. 12 is a structural block diagram of an interval circuit of main sections of the image pickup apparatus.

FIG. 12 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 12, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

In the single-lens mirrorless camera 40 arranged in such manner, by using the plurality of imaging optical systems according to the present invention as the photographing optical system 41, it is possible to capture images of various objects while being small-sized and light-weight. The plurality of imaging optical systems according to the present invention can be used also in an image pickup apparatus of a type having a quick-return mirror.

According to the embodiments of the present invention, it is possible to provide a plurality of imaging optical systems in which, while facilitating a common use of main components of an imaging optical system in the plurality of imaging optical systems, it is possible to reduce a burden of development on manufacturer by facilitating making these main components small-sized and light-weight, and besides to facilitate making a product small-sized and light-weight. Moreover, it is possible to provide an image pickup apparatus which includes the plurality of imaging optical systems.

As described heretofore, the present invention is useful in a plurality of imaging optical systems in which, while facilitating a common use of main components of an imaging optical systems in the plurality of imaging optical systems, it is possible to reduce a burden of development on manufacturer by facilitating making these main components small-sized and light-weight, and besides to facilitate making a product small-sized and light-weight. Moreover, the present invention is useful in an image pickup apparatus which includes the plurality of imaging optical systems.

What is claimed is:

1. A plurality of imaging optical systems comprising:
at least two imaging optical systems having different focal lengths, wherein
each imaging optical system in the plurality of imaging optical systems comprises an identical diaphragm member, and
each imaging optical system comprises in order from an object side,
a front lens unit having a positive refractive power,
a focusing lens unit having a negative refractive power, and
a rear lens unit having a positive refractive power, and
at the time of focusing, only the focusing lens unit moves on an optical axis, and
each imaging optical system satisfies the following conditional expression (1), and
the plurality of imaging optical systems satisfies the following conditional expressions (2) and (3):

$$0.5 < f_{ff}/f_{fb} < 1.9 \quad (1)$$

$$1 \leq AP\Phi_{max}/AP\Phi_{min} \leq 1.15 \quad (2)$$

$$1.02 < f_{foLA}/f_{foSM} < 2.50 \quad (3)$$

where,
$f_{ff}$ denotes a focal length of the front lens unit in each imaging optical system,
$f_{fb}$ denotes a focal length of the rear lens unit in each imaging optical system,
$AP\Phi_{max}$ denotes a maximum diameter from among diameters of aperture stops in the plurality of imaging optical systems,
$AP\Phi_{min}$ denotes a minimum diameter from among diameters of aperture stops in the plurality of imaging optical systems,
$f_{foLA}$ denotes a maximum focal length from among focal lengths of the focusing lens units in the plurality of imaging optical systems, and
$f_{foSM}$ denotes a minimum focal length from among focal lengths of the focusing lens units in the plurality of imaging optical systems, and here,
the maximum focal length and the minimum focal length are to be obtained by comparing absolute values of the focal lengths.

2. A plurality of imaging optical systems comprising:
at least two imaging optical systems having different focal lengths, wherein
each imaging optical system in the plurality of imaging optical systems comprises an identical focusing unit, and
each imaging optical system comprises in order from an object side,
a front lens unit having a positive refractive power, and
a focusing lens unit having a negative refractive power, and
each imaging optical system includes a diaphragm member, and
the diaphragm member is disposed near the focusing lens unit, and
at the time of focusing, only the focusing lens unit moves on an optical axis, and
the plurality of imaging optical systems satisfies the following conditional expressions (3) and (4)

$$1.02 < f_{foLA}/f_{foSM} < 2.50 \quad (3)$$

$$1 \leq K_{max}/K_{min} \leq 1.65 \quad (4)$$

where,
$f_{foLA}$ denotes a maximum focal length from among focal lengths of the focusing lens units in the plurality of imaging optical systems, and
$f_{foSM}$ denotes a minimum focal length from among focal lengths of the focusing lens units in the plurality of imaging optical systems, and here,
the maximum focal length and the minimum focal length are to be obtained by comparing absolute values of the focal lengths,
$K_{max}$ denotes a maximum ratio from among ratios expressed by K,
$K_{min}$ denotes a minimum ratio from among ratios expressed by K,
here,
K (unit mm) is expressed by $K = fb_{LD}/MG_{fo}$,
where,
$fb_{LD}$ is expressed by $fb_{LD} = f^2/2000$ mm,
where,
f denotes a focal length of an overall system of each imaging optical system at the time of infinite object point focusing, and
$MG_{fo}$ denotes a focusing sensitivity of each imaging optical system, where,
the focusing sensitivity is an amount of movement of an image plane with respect to a unit amount of movement of the focusing lens unit at the time of infinite object point focusing.

3. The plurality of imaging optical systems according to claim 1, wherein in each imaging optical system, the identical diaphragm member is disposed between the front lens unit and the focusing lens unit.

4. The plurality of imaging optical systems according to claim 2, wherein in each imaging optical system, the diaphragm member is disposed between the front lens unit and the focusing lens unit.

5. The plurality of imaging optical systems according to claim 1, wherein each imaging optical system satisfies the following conditional expression (5):

$$1.0 < \Phi_{LD}/\Phi_c < 1.25 \quad (5)$$

where,
$\Phi_{LD}$ denotes a maximum effective aperture in the focusing lens unit in each imaging optical system, and
$\Phi_c$ denotes a maximum diameter of an axial image forming light beam in the focusing lens unit in each imaging optical system.

6. The plurality of imaging optical systems according to claim 2, wherein each imaging optical system satisfies the following conditional expression (5):

$$1.0 < \Phi_{LD}/\Phi_c < 1.25 \quad (5)$$

where, $\Phi_{LD}$ denotes a maximum effective aperture in the focusing lens unit in each imaging optical system, and $\Phi_c$ denotes a maximum diameter of an axial image forming light beam in the focusing lens unit in each imaging optical system.

7. The plurality of imaging optical systems according to claim 2, wherein in each imaging optical system, a rear lens unit having a positive refractive power is disposed on an image side of the focusing lens unit.

8. The plurality of imaging optical systems according to claim 1, wherein the plurality of imaging optical systems satisfies the following conditional expression (4)':

$$1 \leq K_{max}/K_{min} \leq 1.60 \quad (4)'$$

where, $K_{max}$ denotes a maximum ratio from among ratios expressed by K, $K_{min}$ denotes a minimum ratio from among ratios expressed by K, here, K (unit mm) is expressed by $K = fb_{LD}/MG_{fo}$, where, $fb_{LD}$ is expressed by $fb_{LD} = f^2/2000$ mm, where, f denotes the focal length of an overall system of each imaging optical system at the time of infinite object point focusing, and $MG_{fo}$ denotes a focusing sensitivity of each imaging optical system, where, the focusing sensitivity is an amount of movement of an image plane with respect to a unit amount of movement of the focusing lens unit at the time of infinite object point focusing.

9. The plurality of imaging optical systems according to claim 7, wherein each imaging optical system satisfies the following conditional expression (1)':

$$0.5 < f_{ff}/f_{fb} < 1.8 \quad (1)'$$

where, $f_{ff}$ denotes a focal length of the front lens unit in each imaging optical system, and $f_{fb}$ denotes a focal length of the rear lens unit in each imaging optical system.

10. The plurality of imaging optical systems according to claim 1, wherein each imaging optical system satisfies the following conditional expression (6):

$$0.06 < |f_{fo}/f| < 0.4 \quad (6)$$

where, $f_{fo}$ denotes a focal length of the focusing lens unit in each imaging optical system, and f denotes a focal length of an overall system of each imaging optical system at the time of infinite object point focusing.

11. The plurality of imaging optical systems according to claim 2, wherein each imaging optical system satisfies the following conditional expression (6):

$$0.06 < |f_{fo}/f| < 0.4 \quad (6)$$

where, $f_{fo}$ denotes a focal length of the focusing lens unit in each imaging optical system, and f denotes the focal length of an overall system of each imaging optical system at the time of infinite object point focusing.

12. The plurality of imaging optical systems according to claim 1, wherein the plurality of imaging optical system includes one of a positive lens and a negative lens as a common lens, and each of at least two imaging optical systems from among the plurality of imaging optical systems includes the common lens in the front lens unit.

13. The plurality of imaging optical systems according to claim 2, wherein the plurality of imaging optical system includes one of a positive lens and a negative lens as a common lens, and each of at least two imaging optical systems from among the plurality of imaging optical systems includes the common lens in the front lens unit.

14. The plurality of imaging optical systems according to claim 1, wherein in at least two imaging optical systems from among the plurality of imaging optical systems, the focusing unit includes an identical member, and the following conditional expression (7) is satisfied $$1 \leq LDW_{max}/LDW_{min} \leq 1.65 \quad (7)$$

where, $LDW_{max}$ denotes a maximum lens gross weight from among lens gross weights of the focusing lens units in the plurality of imaging optical systems, and $LDW_{min}$ denotes a minimum lens gross weight from among lens gross weights of the focusing lens units in the plurality of imaging optical systems.

15. The plurality of imaging optical systems according to claim 2, wherein in at least two imaging optical systems from among the plurality of imaging optical systems, the focusing unit includes an identical member, and the following conditional expression (7) is satisfied $$1 \leq LDW_{max}/LDW_{min} \leq 1.65 \quad (7)$$

where, $LDW_{max}$ denotes a maximum lens gross weight from among lens gross weights of the focusing lens units in the plurality of imaging optical systems, and $LDW_{min}$ denotes a minimum lens gross weight from among lens gross weights of the focusing lens units in the plurality of imaging optical systems.

16. The plurality of imaging optical systems according to claim 1, wherein each imaging optical system satisfies the following conditional expression (8):

$$-2 < f_{fo}/f_{fb} < -0.27 \quad (8)$$

where, $f_{fo}$ denotes a focal length of the focusing lens unit in each imaging optical system, and $f_{fb}$ denotes a focal length of the rear lens unit in each imaging optical system.

17. The plurality of imaging optical systems according to claim 2, wherein each imaging optical system satisfies the following conditional expression (8):

$$-2 < f_{fo}/f_{fb} < -0.27 \quad (8)$$

where, $f_{fo}$ denotes a focal length of the focusing lens unit in each imaging optical system, and $f_{fb}$ denotes a focal length of the rear lens unit in each imaging optical system.

18. The plurality of imaging optical systems according to claim 1, wherein a positive lens from among the common lenses satisfies the following conditional expression (9):

$$80 < \nu d_p \tag{9}$$

where, $\nu d_p$ denotes Abbe's number for the positive lens from among the common lenses.

19. The plurality of imaging optical systems according to claim 2, wherein a positive lens from among the common lenses satisfies the following conditional expression (9):

$$80 < \nu d_p \tag{9}$$

where, $\nu d_p$ denotes Abbe's number for the positive lens from among the common lenses.

20. The plurality of imaging optical systems according to claim 1, wherein each imaging optical system satisfies the following conditional expression (10):

$$0.023 \leq SC/L \leq 0.110 \tag{10}$$

where,

SC denotes a distance from the diaphragm member in each imaging optical system up to a lens surface positioned on the object side of the focusing lens unit, and is a distance at the time of infinite object point focusing, and L denotes a total length of the optical system in each imaging optical system.

21. The plurality of imaging optical systems according to claim 2, wherein each imaging optical system satisfies the following conditional expression (10):

$$0.023 < SC/L \leq 0.110 \tag{10}$$

where,

SC denotes a distance from the diaphragm member in each imaging optical system up to a lens surface positioned on the object side of the focusing lens unit, and is a distance at the time of infinite object point focusing, and L denotes a total length of the optical system in each imaging optical system.

22. The plurality of imaging optical systems according to claim 1, wherein each imaging optical system satisfies the following conditional expression (11)

$$0.2 \leq SC/AP\Phi \leq 1.0 \tag{11}$$

where,

SC denotes a distance from the diaphragm member in each imaging optical system up to a lens surface positioned on the object side of the focusing lens unit, and is a distance at the time of infinite object point focusing, and AP$\Phi$ denotes a diameter of an aperture stop in each imaging optical system.

23. The plurality of imaging optical systems according to claim 2, wherein each imaging optical system satisfies the following conditional expression (11)

$$0.2 \leq SC/AP\Phi \leq 1.0 \tag{11}$$

where,

SC denotes a distance from the diaphragm member in each imaging optical system up to a lens surface positioned on the object side of the focusing lens unit, and is a distance at the time of infinite object point focusing, and AP$\Phi$ denotes a diameter of an aperture stop in each imaging optical system.

24. The plurality of imaging optical systems according to claim 1, wherein two imaging optical systems from among the plurality of imaging optical systems satisfy the following conditional expression (12):

$$1.2 < f_L/f_s \tag{12}$$

where, $f_L$ denotes a long focal length from among focal lengths at the time of infinite object point focusing of the overall system of the two imaging optical systems, and $f_s$ denotes a short focal length from among focal lengths at the time of infinite object point focusing of the overall system of the two imaging optical systems.

25. The plurality of imaging optical systems according to claim 2, wherein two imaging optical systems from among the plurality of imaging optical systems satisfy the following conditional expression (12):

$$1.2 < f_L/f_s \tag{12}$$

where, $f_L$ denotes a long focal length from among focal lengths at the time of infinite object point focusing of the overall system of the two imaging optical systems, and $f_s$ denotes a short focal length from among focal lengths at the time of infinite object point focusing of the overall system of the two imaging optical systems.

26. The plurality of imaging optical systems according to claim 2, wherein each imaging optical system includes an identical diaphragm member.

27. The plurality of imaging optical systems according to claim 1, wherein a diameter of an aperture stop of the diaphragm member in each imaging optical system is let to be AP$\Phi_{max}$, where, AP$\Phi_{max}$ denotes the maximum diameter from among diameters of aperture stops in the plurality of imaging optical systems.

28. The plurality of imaging optical systems according to claim 26, wherein a diameter of an aperture stop of the diaphragm member in each imaging optical system is let to be AP$\Phi_{max}$, where, AP$\Phi_{max}$ denotes the maximum diameter from among diameters of aperture stops in the plurality of imaging optical systems.

29. The plurality of imaging optical systems according to claim 27, wherein in an imaging optical system with an optical diaphragm diameter smaller than AP$\Phi_{max}$ of the diaphragm member, setting of the optical diaphragm is carried by diaphragm blades narrowed down to an F-number at maximum aperture, and the number of diaphragm blades is an odd number not less than seven.

30. The plurality of imaging optical systems according to claim 28, wherein in an imaging optical system with an optical diaphragm diameter smaller than AP$\Phi_{max}$ of the diaphragm member, setting of the optical diaphragm is carried by diaphragm blades narrowed down to an F-number at maximum aperture, and the number of diaphragm blades is an odd number not less than seven.

31. The plurality of imaging optical systems according to claim 26, wherein in the imaging optical system with an optical diaphragm diameter smaller than AP$\Phi_{max}$ of an identical diaphragm member, a light shielding member having a circular opening section is disposed additionally near a diaphragm frame member such that, an F-number at maximum aperture becomes a predetermined F-number.

32. The plurality of imaging optical systems according to claim 1, wherein the diaphragm member is disposed near the focusing lens unit.

33. An image pickup apparatus comprising:
an imaging optical system; and
an image pickup element which has an image pickup surface, and which converts an image formed on the image pickup surface by the imaging optical system, to an electric signal, wherein
the imaging optical system is one of the plurality of imaging optical systems according to claim 1.

34. An image pickup apparatus comprising:
an imaging optical system; and
an image pickup element which has an image pickup surface, and which converts an image formed on the image pickup surface by the imaging optical system, to an electric signal, wherein
the imaging optical system is one of the plurality of imaging optical systems according to claim 2.

* * * * *